United States Patent
Lee et al.

(10) Patent No.: US 10,620,690 B2
(45) Date of Patent: Apr. 14, 2020

(54) MOBILE TERMINAL AND CONTROLLING METHOD THEREOF

(71) Applicant: LG ELECTRONICS INC., Seoul (KR)

(72) Inventors: Eunhye Lee, Seoul (KR); Kyungdong Choi, Seoul (KR); Juhee Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/426,821

(22) Filed: Feb. 7, 2017

(65) Prior Publication Data

US 2018/0129268 A1    May 10, 2018

(30) Foreign Application Priority Data

Nov. 9, 2016 (KR) .......................... 10-2016-0148612

(51) Int. Cl.
*G06F 1/3287* (2019.01)
*G09G 5/00* (2006.01)
(Continued)

(52) U.S. Cl.
CPC ........ *G06F 1/3287* (2013.01); *G06F 3/04886* (2013.01); *G09G 5/00* (2013.01); *G09G 5/10* (2013.01); *H04M 1/72522* (2013.01); *H04M 1/72569* (2013.01); *G06F 2203/04803* (2013.01); *G09G 2320/0646* (2013.01); *G09G 2360/144* (2013.01); *H04M 2250/16* (2013.01)

(58) Field of Classification Search
CPC .... G06F 1/3287; G06F 1/3206; G06F 1/3234; G09G 2320/0646; G09G 2330/027
See application file for complete search history.

(56) References Cited

U.S. PATENT DOCUMENTS 8,738,090 B2 * 5/2014 Kanda ..................... G06F 21/36
                                                    345/173
9,389,752 B2 * 7/2016 Higuchi ................ G06F 3/0482
(Continued)

FOREIGN PATENT DOCUMENTS

FR              3022649              12/2015

OTHER PUBLICATIONS

European Patent Office Application Serial No. 17000015.2, Search Report dated Jun. 30, 2017, 8 pages.

*Primary Examiner* — Antonio A Caschera
(74) *Attorney, Agent, or Firm* — Lee, Hong, Degerman, Kang & Waimey

(57) ABSTRACT

A mobile terminal and controlling method thereof is provided. The mobile terminal includes a display having at least one screen and operating in either a first mode or a second mode and a controller detecting a command to turn off the display, controlling the display to activate a first region of a screen, deactivate a second region of the screen and display information related to an application on the activated first region in response to the command when the display is operated in the first mode, the information including at least first information related to a parameter of a function performed by the application or second information related to progress of the function and control the display to deactivate the entire screen in response to the command when the display is operated in the second mode.

20 Claims, 29 Drawing Sheets

(51) Int. Cl.
  *H04M 1/725* (2006.01)
  *G06F 3/0488* (2013.01)
  *G09G 5/10* (2006.01)

(56) References Cited

U.S. PATENT DOCUMENTS

| | | |
|---|---|---|
| 2015/0070333 A1 | 3/2015 | Sagawa |
| 2015/0234586 A1 | 8/2015 | Lee et al. |
| 2015/0277756 A1 | 10/2015 | Kim |
| 2015/0294627 A1* | 10/2015 | Yoo .......................... G06F 3/147 345/690 |
| 2015/0365509 A1 | 12/2015 | Park |

* cited by examiner

MOBILE TERMINAL AND CONTROLLING METHOD THEREOF

Pursuant to 35 U.S.C. § 119(a), this application claims the benefit of earlier filing date and right of priority to Korean Patent Application No. 10-2016-0148612, filed on Nov. 9, 2016, the contents of which are all hereby incorporated by reference herein in its entirety.

FIELD OF THE INVENTION

The present invention relates to a mobile terminal and controlling method thereof.

DISCUSSION OF THE RELATED ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Meanwhile, according to the related art, although the display 151 is turned off in response to a display-off command in Always-on-Display mode, a partial region of the display unit 151 can be activated. And, preset information can be displayed on the activated partial region.

However, according to the related art, the information displayed on the activated partial region is considerably limited. Hence, it is a problem that a user has difficulty in obtaining user-desired information in a status that a display unit is turned off.

Thus, the demand for developing a mobile terminal and controlling method thereof, by which the above problem of the related art mobile terminal can be solved, is increasingly rising.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which information of a specific application can be displayed on a partial region activated in response to a display-off command while a display unit is operating in Always-on-Display mode.

Another object of the present invention is to provide a mobile terminal and controlling method thereof, by which brightness of a partial region activated in response to a display-off command can be changed according to ambient illumination intensity while a display unit is operating in Always-on-Display mode.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to one embodiment of the present invention may include a display comprising at least one screen and configured to operate in either a first mode or a second mode and a controller, characterized in that the controller is further configured to detect a command to turn off the display, control the display to activate a first region of a screen, deactivate a second region of the at least one screen and display information related to an application on the activated first region in response to the command when the display is operated in the first mode, wherein the information comprises at least first information related to a parameter of a function performed by the application or second information related to progress of the function and control the display to deactivate the entire at least one screen in response to the command when the display is operated in the second mode.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

A mobile terminal and method for controlling the same according to the present invention provide the following effects and/or features.

According to one embodiment of the present invention, while a display unit is operating in Always-on-Display mode, since information of a specific application is displayed on a partial region activated in response to a display-off command, a user can advantageously obtain information desired by the user without turning on the display unit.

According to another embodiment of the present invention, while a display unit is operating in Always-on-Display mode, brightness of a partial region activated in response to a display-off command can be advantageously changed according to ambient illumination intensity.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
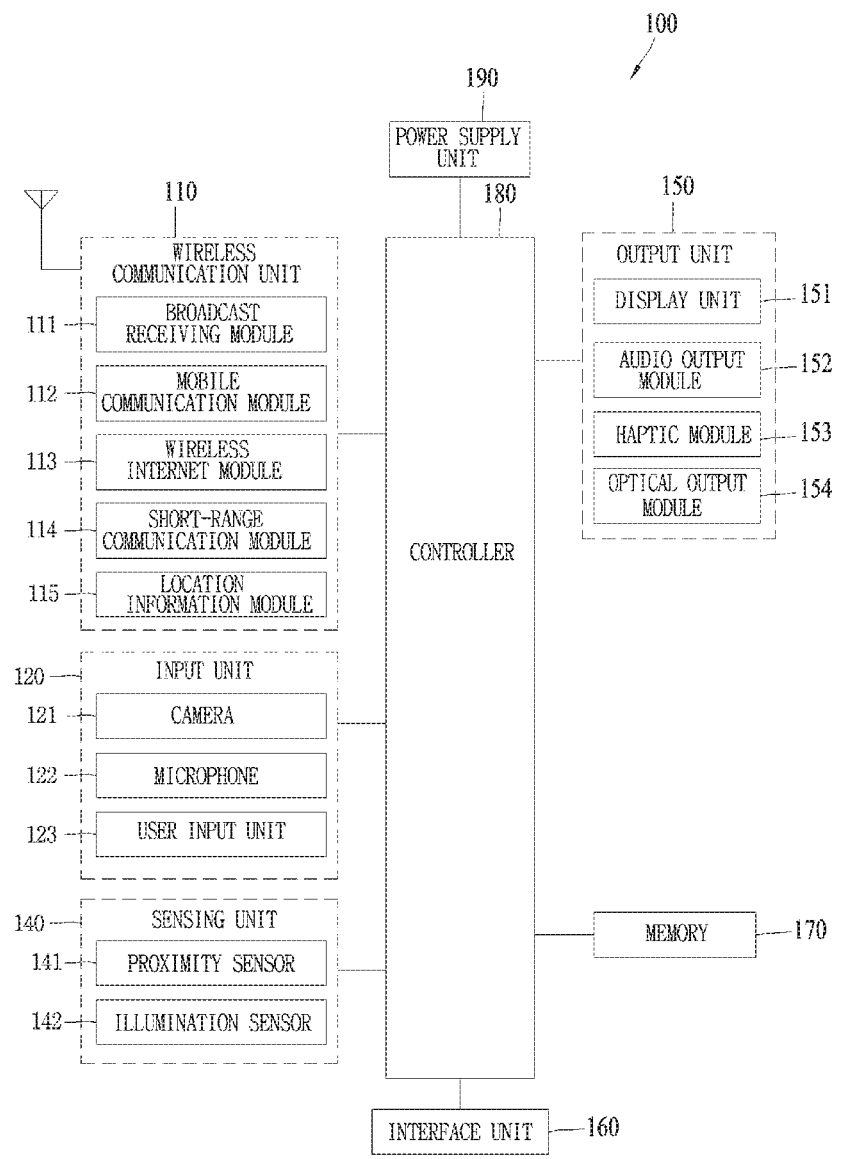
FIG. 1A is a block diagram of a mobile terminal in accordance with the present disclosure.
Figure 1B:
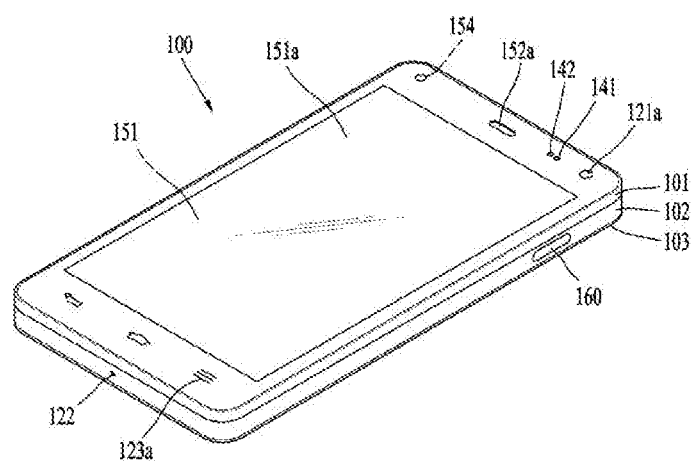
FIGS. 1B and 1C are conceptual views of one example of the mobile terminal, viewed from different directions.
Figure 1C:
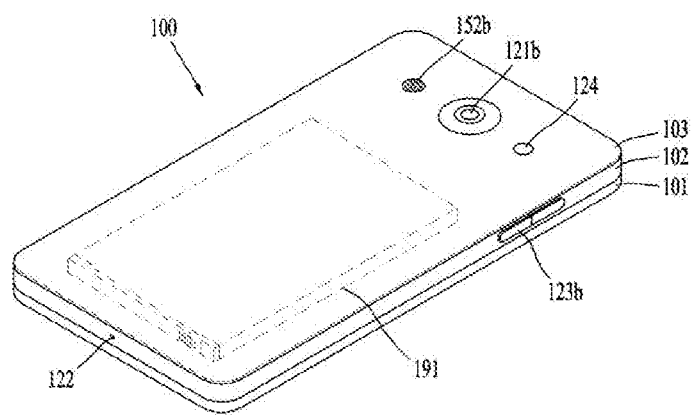

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) related to the mobile terminal 100.

The controller 180 typically functions to control overall operation of the mobile terminal 100, in addition to the operations associated with the application programs. The controller 180 processes signals, data, information and the like inputted or outputted through the above-mentioned components and/or runs application programs saved in the memory 170, thereby processing or providing a user with appropriate information and/or functions.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located related to a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed related to a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based related to a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors.

The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the first audio output unit 152a, the second audio output unit 152b, the proximity sensor 141, the illumination sensor 142, the optical output unit 154, the first camera 121a, the second camera 121b, the first manipulating unit 123a, the second manipulating unit 123b, the microphone 122, the interface unit 160, and the like.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

Figure 10:
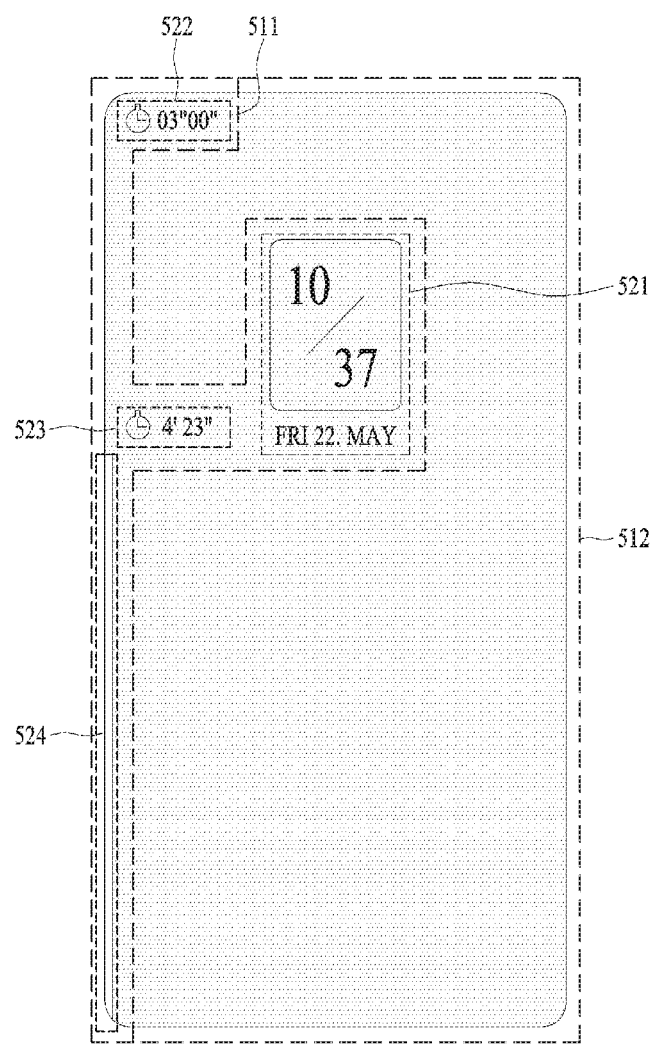
FIGS. 10 to 16 are diagrams to describe examples of a method of providing information of a specific application through a display unit in Always-on-Display mode according to one embodiment of the present invention.

As shown in FIG. 10, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, according to the present invention, it is able to display information processed by the mobile terminal using a flexible display. This is described in detail with reference to the accompanying drawings as follows.

Figure 2:
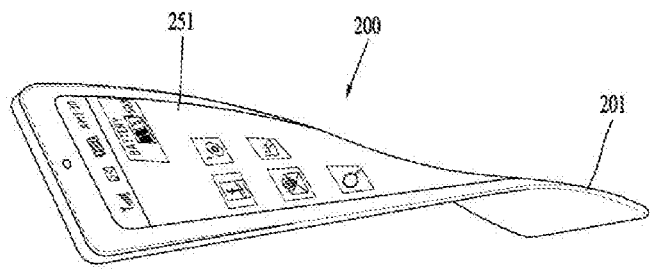
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel)

arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state(or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, a rate at which the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
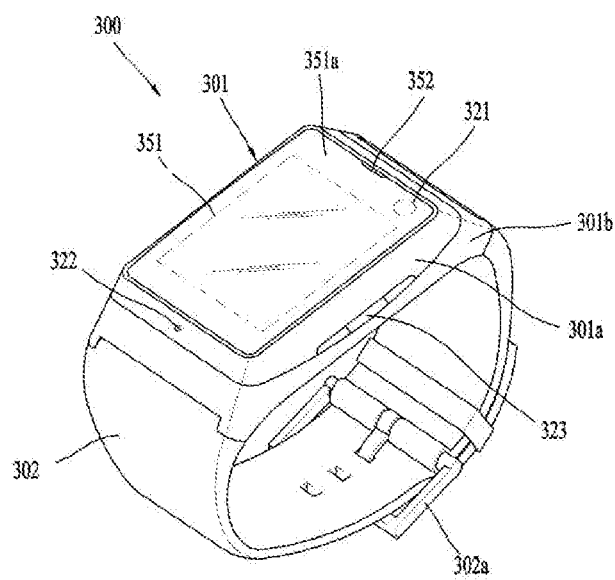
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302*a* is implemented using a buckle.

Figure 4:
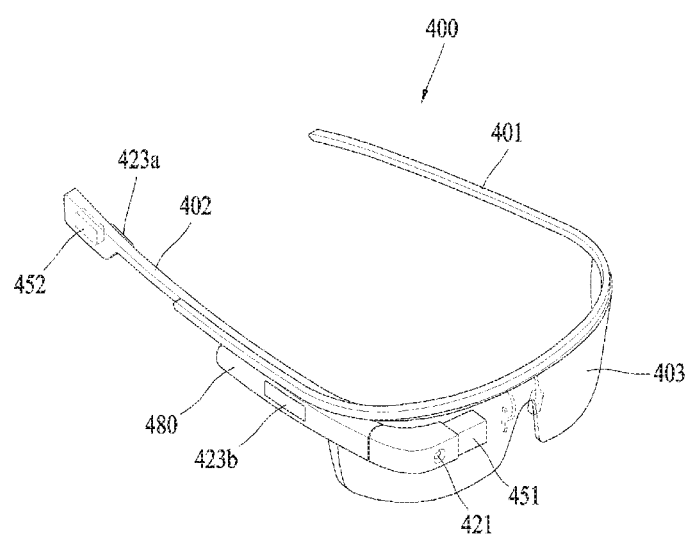
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423*a* and 423*b*, which can each be manipulated by the user to provide an input. The user input units 423*a* and 423*b* may employ techniques which permit input via a tactile input. Typical tactile inputs include a touch, push, or the like. The user input units 423*a* and 423*b* are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A(Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information related to an entrance card approaches an entrance card reader, an entrance approval procedure may start. A card such as a credit card, a traffic card, or an entrance card may be included in the security module in the form of applet, and the security module may store card information on the card mounted therein. Card information related to a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

By taking the former mobile terminal 100 shown in FIG. 1A as an example of a mobile terminal, embodiments of the present invention are described as follows. Yet, it is a matter of course that a mobile terminal according to one embodiment of the present invention can be embodied into one of the former mobile terminals 200, 300 and 400 shown in FIGS. 2 to 4.

Status Change of Display

In the mobile terminal 100 according to one embodiment of the present invention, the display unit 151 may enter various statuses. This is described in detail with reference to FIG. 5 and FIG. 6.

Figure 5:
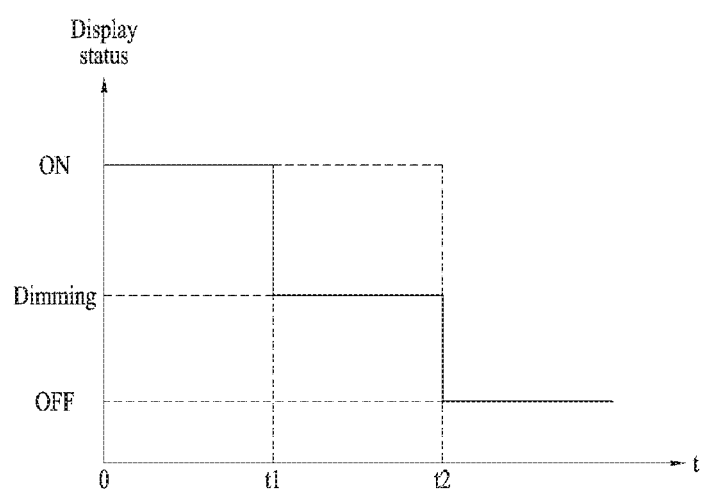
FIG. 5 and FIG. 6 are diagrams of states of a mobile terminal according to one embodiment of the present invention.
Figure 6:
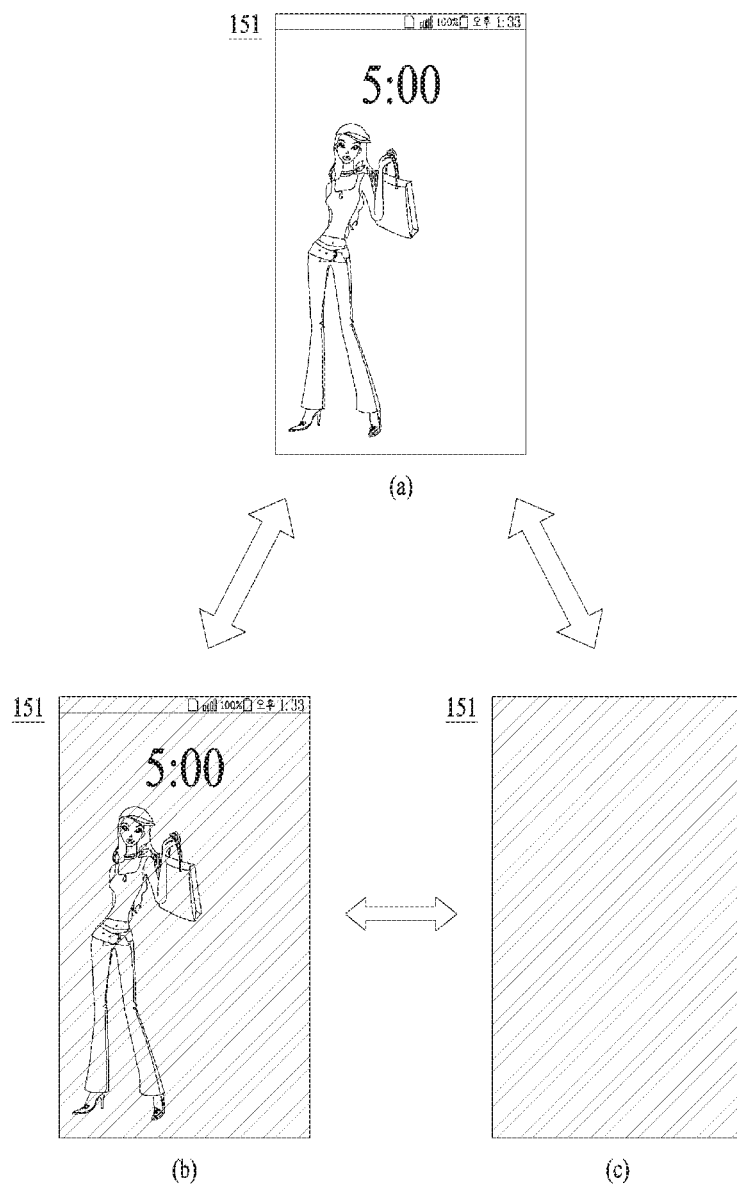

FIG. 5 and FIG. 6 are diagrams of states of a mobile terminal according to one embodiment of the present invention.

Referring to FIG. 5, the display unit 151 may enter one of a first status (ON) that the display unit 151 is turned on in response to a display-on command, a second status (Dimming) that the display unit 151 is dim, and a third status (OFF) that the display unit 151 is turned off in response to a display-off command.

Particularly, in response to the ON command, the controller 180 enables the display unit 151 to enter the first status by activating a full region of the display unit 151. While a status of the display unit 151 is the first status, if a preset time t1 expires without a user input, the controller 180 may change the status of the display unit 151 into the second status for the reduction of power use. While a status of the display unit 151 is the second status, if a preset time t2 expires without a user input, the controller 180 may change the status of the display unit 151 into the third status in order to further reduce the power use.

Meanwhile, as shown in FIG. 6, a display status may vary according to a status of the display unit 151 of the mobile terminal 100.

Referring to FIG. 6(a), while the display unit 151 is in the first status, the controller 180 may control the display unit 151 to display a preset video (or preset information) in a first brightness. Herein, the first brightness may include a brightness when a backlight of the mobile terminal 100 operates at a maximum brightness or a brightness close to the maximum brightness. Yet, the first brightness may vary to correspond to ambient illumination intensity.

Referring to FIG. 6(b), while the display unit 151 is in the second status, the controller 180 may control the display unit 151 to display the preset video (or the preset information) in a second brightness. Herein, the first brightness may include a dimming status. Namely, the second status may include a status that a backlight is turned off despite that the video is displayed on the whole display unit 151.

Referring to FIG. 6(c), while the display unit 151 is in the third status, the controller 180 may control the display unit 151 to be turned off. Namely, in the third status, the display unit 151 can be deactivated.

AoD (Always on Display) Mode

According to one embodiment of the present invention, the controller 180 can control the display unit 151 to activate a partial region of a screen in Always-on-Display (hereinafter abbreviated AoD) mode despite that a status of the display unit 151 is the third status and also control preset information to be displayed on the activated partial region on the display unit 151. This is described in detail with reference to FIG. 7 and FIG. 8.

Figure 7:
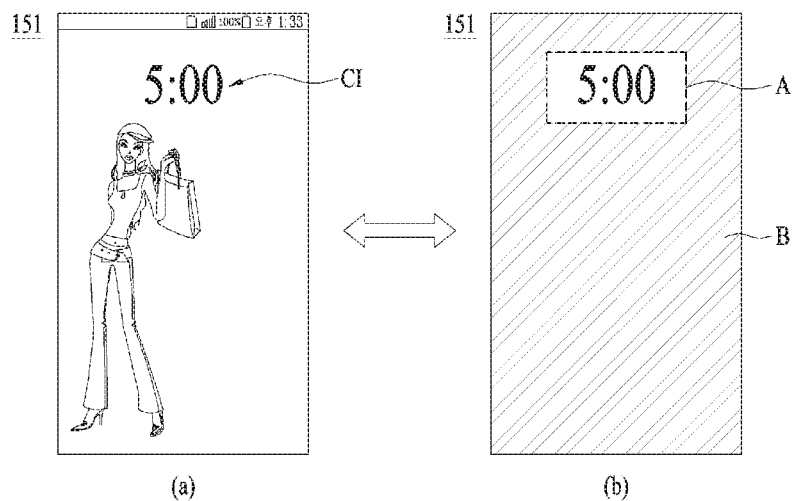
FIG. 7 and FIG. 8 are diagrams to describe examples of an Always-on-Display mode.
Figure 8:
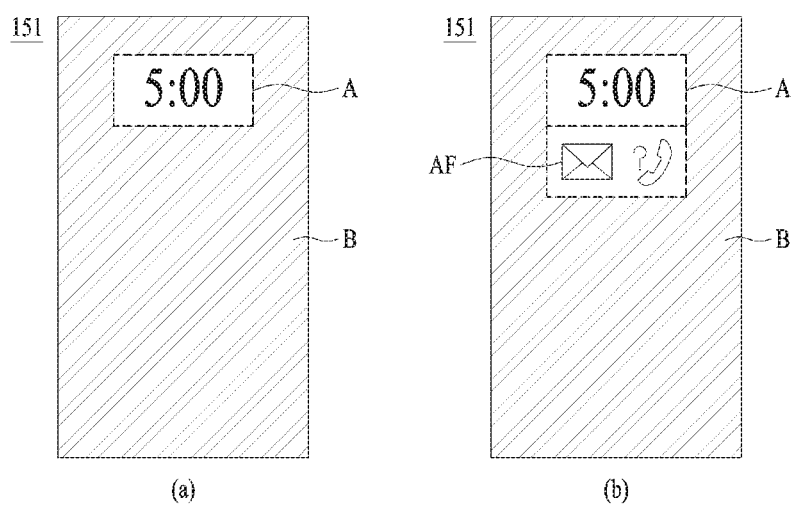

FIG. 7 and FIG. 8 are diagrams to describe examples of an Always-on-Display mode.

According to one embodiment of the present invention, if the controller 180 detects a display-off (OFF) command in AoD mode, the controller 180 may control the display unit 151 to activate a partial region of a screen and deactivate the rest of the screen, in response to the OFF command. Meanwhile, the controller 180 may control the display unit 151 to deactivate the full region of the screen if detecting a display-off command in normal mode.

Herein, the AoD mode means a mode for activating a partial region of the display unit 151 in response to a display-off command. In other words, the AoD mode may mean a mode for selectively activating an activated region of the display unit 151 in response to the display-off command. In other words, the AoD mode may mean a mode for deactivating (or, reducing activation of) the rest of regions of the display unit 151 except the activated region.

Since the partial region is activated only in the AoD mode, it is able to minimize power consumption. If the partial region is activated only according to the AoD mode, since information required by a user can continue to be displayed on the display unit 151, it is advantageous in that the user can always check the required information.

First of all, referring to FIG. 7(*a*), in response to a display-on command, if recognizing that the display unit 151 is in a first status (i.e., ON status), the controller 180 may activate a full region of the display unit 151. And, the controller 180 may control the display unit 151 to display a user-set image (e.g., a lock screen image) on the activated full region. Moreover, the controller 180 may control the display unit 151 to display current time information (CI) on a partial region of the activated full region.

Referring to FIG. 7(*b*), in response to a display-off command in AoD mode, the controller 180 may control the display unit 151 to activate a first region A of the display unit 151 and deactivate a second region B of the display unit 151.

Namely, in the AoD mode, when the display-off mode is detected, as shown in FIG. 6(*c*), the full region of the display unit 151 is not deactivated. Instead, as shown in FIG. 7(*b*), the partial region A is activated only but the rest region B is deactivated.

Eventually, if recognizing that the display unit 151 operates in AoD mode, the controller 180 may control the display unit 151 to activate the first region A in the screen and deactivate the second region B, in response to the OFF command. Yet, if recognizing that the display unit 151 operates in normal mode, the controller 180 may control the display unit 151 to deactivate the full region of the screen.

Meanwhile, the controller 180 may control the display unit 151 to activate the partial region A only despite expiration of a preset time after the second status described with reference to FIG. 5 and FIG. 6.

Meanwhile, the controller 180 may control the display unit 151 to display a current hour information (CI), an information corresponding to an event occurrence of a message and the like on the activated first region A. Namely, in the AoD mode, even if a display-off command is detected, minimum information required by a user can be provided through the display unit 151. In particular, information such as a current hour and the like can be provided through the activated region A.

In the AoD mode, a status that the display unit 151 is turned off is different from the second status described with reference to FIG. 5 and FIG. 6. In particular, the second status described with reference to FIG. 5 and FIG. 6 is a status that an overall backlight within a screen is deactivated. Yet, in the AoD mode, a status that the display unit 151 is turned off means a status that a backlight is applied to the first region A.

In the AoD mode, a status that the display unit 151 is turned off is different from the third status described with reference to FIG. 5 and FIG. 6. In particular, the status described with reference to FIG. 5 and FIG. 6 is a status that a full region of the display unit 151 is deactivated. Yet, in the AoD mode, a status that the display unit 151 is turned off means a status that minimum information is displayed on a partial region, which is activated, of the display unit 151.

The activated region A may include a region A corresponding to a location of a watch display region having a current hour information (CI) displayed thereon when the mobile terminal 100 is in the first status and/or the second status. Hence, while the display unit 151 operates in AoD mode, the controller 180 may control the display unit 151 to activate the first region A only and also display the current hour information (CI) on the first region A, in response to the OFF command. Therefore, it is able to provide a user with the current hour information without sense of difference.

Meanwhile, referring to FIG. 8(*a*), current hour information may be displayed on an activated region A. Considering a fact that the mobile terminal 100 is frequently used to check a current hour, the current hour information may be useful information for a user. Considering a related art case that a user switches the third status, in which the display unit 151 is turned off, to the first status by additionally manipulating the mobile terminal 100, user's convenience and/or an efficient use of resources of the mobile terminal 100 is enhanced. Namely, it means that a user can check necessary information at any time without additional manipulation.

For instance, while the display unit 151 is in OFF status as well as while the mobile terminal 100 is in the first or second status, hour information and the like can be immediately confirmed through the activated region A. By enabling the activated region A to operate only, power (or current) consumption of the mobile terminal 100 can be minimized despite displaying information.

Referring to FIG. 8(*b*), additional information (AF) may be displayed on the activated region A. Herein, the additional information (AF) may include information related to an occurring event such as a presence or non-presence of a message reception, a presence or non-presence of a missed call, and the like.

The additional information (AF) may not change a display location of the hour information already displayed within the activated region A. Namely, it means that a location and/or size of the hour information may not be changed due to the display of the additional information (AF). Hence, the hour information basically displayed within the activated region A can be continuously displayed at a specific location.

The present embodiment is non-limited by the above description. For instance, in AoD mode, the controller 180 may activate a light source corresponding to a location of information to be displayed in response to a display-off command and also deactivate the rest of the light source.

For instance, referring to FIG. 8(*a*), in AoD mode, the controller 180 may activate an extremely small number of light sources for displaying '5:00' in response to a display-off command and also deactivate the rest of the light sources.

The following description is related to a case that a partial region of the display unit is activated by deactivating the rest of the display unit in response to a display-off command in AoD mode. Yet, according to the embodiments in the following description, some of light sources may be activated while the rest of the light sources are deactivated.

Meanwhile, according to an embodiment, if sensing a touch input to a prescribed activated region, the controller 180 may perform a job according to the sensed touch input. Yet, if sensing a touch input to the deactivated region, the controller 180 may ignore the sensed touch input. Moreover, although a user touches the deactivated region, since a corresponding touch input is not sensed from the deactivated region, a mobile terminal may not react at all.

Method of Providing Information of Specific Application in AoD (Always on Display) Mode According to one embodiment of the present invention, while the display unit 151 operates in AoD mode, the controller 180 may control the display unit 151 to display information of a specific application on a prescribed activated region of a screen of the display unit 151 in response to a display-off command. This is described in detail with reference to FIGS. 9 to 16.

The following description is made on the assumption that an AoD (Always on Display) mode is a mode for activating a first region of a screen in response to a display-off command while deactivating a second region of the screen. And, assume that a normal mode is a mode for deactivating a full region of the screen in response to a display-off command.

Figure 9:
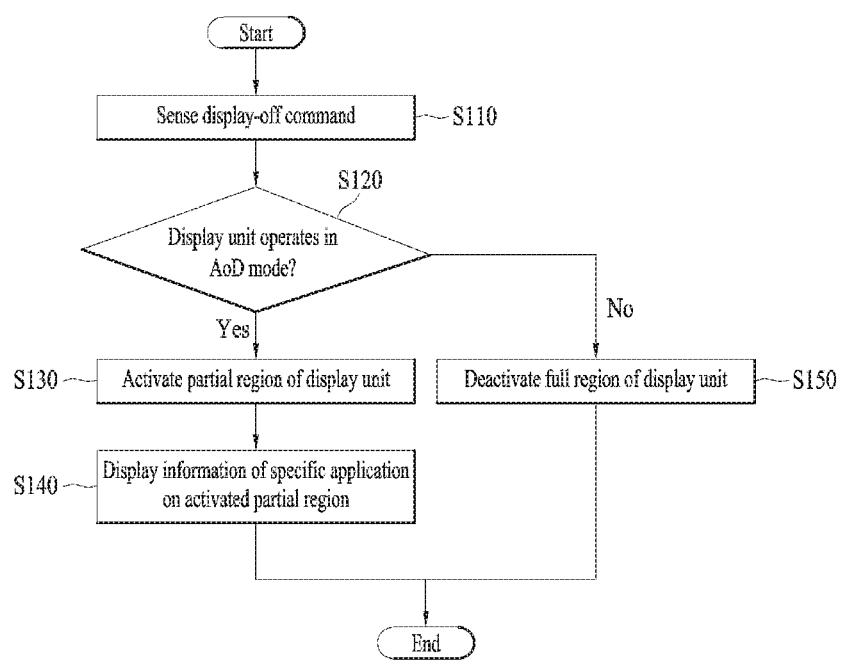
FIG. 9 is a flowchart to describe one example of a method of providing information of a specific application to an activated partial region in Always-on-Display mode in a mobile terminal according to one embodiment of the present invention.

FIG. 9 is a flowchart to describe one example of a method of providing information of a specific application to an activated partial region in Always-on-Display mode in a mobile terminal according to one embodiment of the present invention.

According to the present invention, the controller 180 may sense a display-off command [S110].

For instance, the controller 180 may recognize a touch input of touching a screen of the display unit 151 a preset count of times as an OFF command for turning off the display unit 151.

For another instance, the controller 180 recognizes a movement of the mobile terminal 100 through the sensing unit 140. If the recognized movement corresponds to a preset movement, the controller 180 can recognize it as an OFF command for turning off the display unit 151.

For further instance, if sensing an input to a preset physical key, the controller 180 can recognize it as an OFF command for turning off the display unit 151.

If sensing a display-off command [S110], the controller 180 may recognize whether the display unit 151 operates in AoD mode [S120].

If recognizing that the display unit 151 operates in the AoD mode [S120, YES], the controller 180 may control the display unit 151 to activate a partial region of the display unit 151 and deactivate (or, lower an activation level of) the rest region of the display unit 151.

According to one embodiment of the present invention, if sensing a touch input to the activated partial region, the controller 180 may perform a function corresponding to the sensed touch input. Yet, if sensing a touch input to the deactivated rest region, the controller 180 may ignore the sensed touch input.

Meanwhile, the controller 180 may control the display unit 151 to display information of a specific application on the activated partial region. Herein, the specific application may include an application that can be launched in a status that the display unit 151 is turned off. The information of the specific application may include at least first information related to a function currently performed by the specific application or second information corresponding to a progress level of the function.

Eventually, in a state that the partial region on the screen is activated in response to the display-off command, the controller 180 may control the display unit 151 to display the information on the currently run application on the activated partial region.

On the other hand, if recognizing that the display unit operates in normal mode instead of operating in the AoD mode [S120, NO], the controller 180 may control the display unit 151 to deactivate a full region of the display unit 151 [S150].

FIGS. 10 to 16 are diagrams to describe examples of a method of providing information of a specific application through a display unit in Always-on-Display mode according to one embodiment of the present invention.

While the display unit 151 operates in AoD mode, if the controller 180 senses an OFF command for turning off the display unit, the controller 180 may control the display unit 151 to activate a first region 511 of a screen and deactivate a second region 512 of the screen.

The following description is made on the assumption that the display unit 151 operates in AoD mode and that the first region 511 is activated only in response to the OFF command for turning off the display unit.

Referring to FIGS. 10 to 16, in a status that the first region 511 and the second region 512 are activated and deactivated, respectively, the controller 180 may control the display unit 151 to display preset information within the activated first region 511. Herein, the preset information may include at least one of information of a specific application, current hour information, date information, calendar information, scheduling information and the like.

The controller 180 may change a size of the activated first region 511 in accordance with a size of a region on which the preset information will be displayed.

For instance, if the size of the region for displaying the preset information 520 thereon corresponds to a first size, the controller 180 can activate a region corresponding to the first size. Meanwhile, if the size of the region for displaying the preset information 520 thereon corresponds to a second size, the controller 180 can activate a region corresponding to the second size.

Namely, the controller 180 can adjust the size of the activated first region 511 and the size of the deactivated second region 512 according to the size of the region on which the preset information is displayed.

Herein, the activated first region 511 and the deactivated second region 512 may have various shapes. Namely, the shape of the first region 511 is changeable according to an information displayed location within the screen.

Eventually, the controller 180 may control the display unit 151 to activate a region within the screen corresponding to the preset information displayed location.

According to one embodiment of the present invention, the controller 180 may control the display unit 151 to display at least one of the current hour information, the date information, the calendar information and the scheduling information among the preset information on the first partial region 521 within the activated first region 511 [cf. FIGS. 10 to 16].

Meanwhile, according to one embodiment of the present invention, the controller 180 may control the display unit 151 to display the information of the specific application on the activated first region 511.

The following description relates to a case that displayed information of a specific application is changed according to a function of the specific application.

If the function is an alarm function, the first information and the second information may include information related to an alarm-set specific time and information indicating a time remaining until the specific time, respectively. Herein, the specific application may include an alarm application, by which the present invention is non-limited. And, the specific application may include another application containing an alarm function.

In particular, the controller 180 may obtain information on the specific time, for which the alarm is set, from the alarm function. And, the controller 180 may control the display unit 151 to display the first information and the second information using the information on the specific time.

In more particular, referring to FIG. 10, the controller 180 may control the display unit 151 to display first information indicating the alarm-set specific time on a second partial region 522 within the activated first region 511. And, the controller 180 may control the display unit 151 to display a second information indicating a remaining time until the alarm-set specific time from a current time on a third partial region 523 within the activated first region 511. Moreover, the controller 180 may control the display unit 151 to display the second information as a progress bar on a fourth partial region 524 within the activated first region 511.

For instance, assuming that a current time and an alarm-set time are 10:37 AM and 3 PM, respectively, the controller 180 may control the display unit 151 to display a first information indicating 3 PM on the second partial region 522. And, the controller 180 may control the display unit 151 to display a second information indicating 4 hours and 23 minutes, which is a remaining time until 3 PM from the current time, on the third partial region 523. Moreover, the controller 180 may control the display unit 151 to display a second information indicating 4 hours and 23 minutes, which is a remaining time until 3 PM from the current time, as a bar on the fourth partial region 543.

The second information may change according to a time flow. For instance, if the current time is changed into 11 o'clock, the second information can be changed into 3 hours 23 minutes and a progress bar corresponding to the changed information can be outputted within the first region 511.

The third partial region 523 may include a region corresponding to the second information. And, the progress bar may be created using the second information.

Meanwhile, if the function is a wayfinding function, the first information may include information related to a destination and the second information may include information indicating at least one of a remaining time to the destination from a current location and a time consumed from an origination to the current location. Herein, the specific application may include an application capable of performing the wayfinding function.

In particular, if the function is the wayfinding function, the controller 180 may recognize a current location by activating the location information module 115. And, the controller 180 may control the wireless communication unit 110 to transmit information on the current location and information on the destination to an external server related to the wayfinding function. And, the controller 180 may control the wireless communication unit 110 to receive information related to a time remaining to the destination, information related to a distance remaining to the destination and the like from the external server related to the wayfinding function. Moreover, the controller 180 may control the display unit 151 to display the first information and the second information using the received information.

Figure 11:
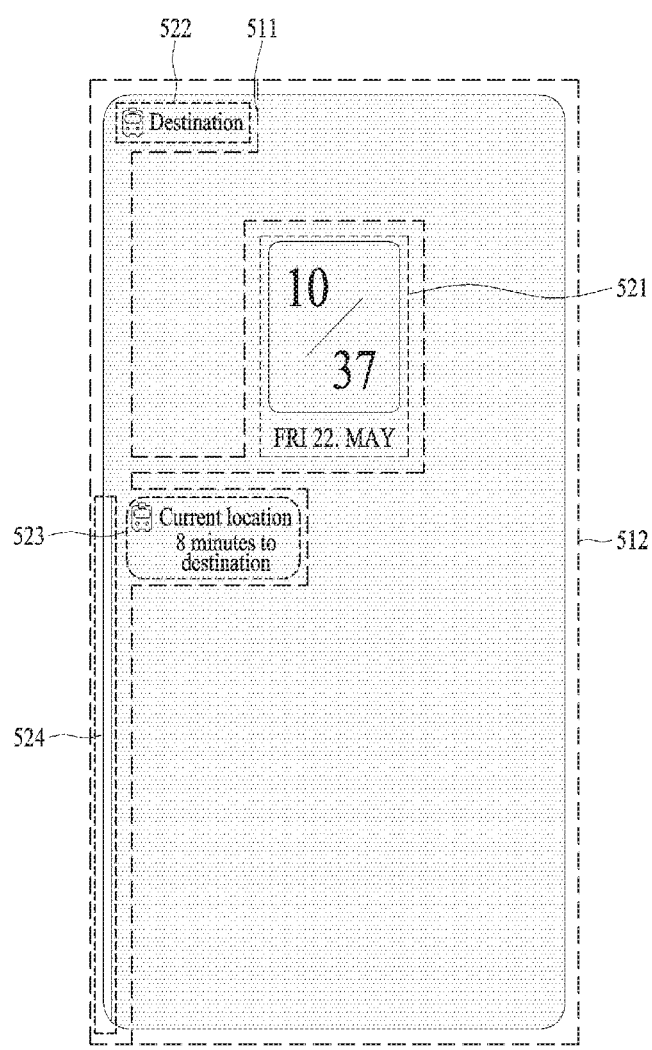

In more particular, referring to FIG. 11, the controller 180 may control the display unit 151 to display first information indicating a destination on the second partial region 522 within the activated first region 511. And, the controller 180 may control the display unit 151 to display second information indicating a time remaining to the destination from a current location on the third partial region 523 within the first region 511. Moreover, the controller 180 may control the display unit 151 to display second information indicating a time consumed from an origination to the current location and a time remaining to the destination as a progress bar on the fourth partial region 524 within the activated first region 511.

The third partial region 523 may be determined using a distance from the origination to the destination and a distance from the origination to the current location. Hence, if the current location is changed, the third partial region 523 having the second information displayed thereon may be changed.

A length of the progress bar displayed on the fourth partial region 524 may be determined using a distance from the origination to the destination and a distance from the origination to the current location.

A user checks at least one of the location of the second information displayed on the third partial region 523 and the length of the progress bar displayed on the fourth partial region 524, thereby recognizing a time consumed to the current location (or a distance moved to the current location) and a time (or distance) remaining to the destination.

Meanwhile, if the function is the wayfinding function, the controller 180 may control the display unit 151 to display information related to an intermediate event within the first region 511.

In particular, the controller 180 may control the wireless communication unit 110 to receive information related to an intermediate event from the external server related to the wayfinding function. Using the received information, the controller 180 may control the display unit 151 to display the information on the intermediate event on the activated first region 511.

Figure 12:
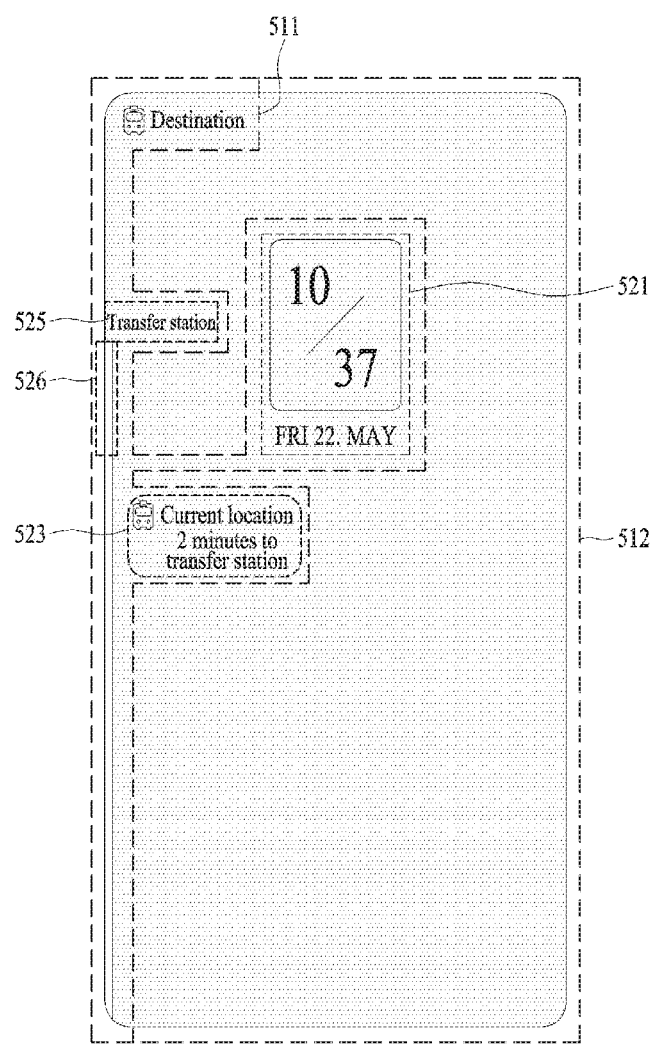

In more particular, referring to FIG. 12, the controller 180 may control the display unit 151 to display information related to a transfer station for the destination on a fifth partial region 525 within the first region 511.

Herein, the fifth partial region 525 may be determined using a distance from an origination to an intermediate event occurring location and a distance from the intermediate event occurring location to the destination.

And, the controller 180 may control the display unit 151 to display the information on the intermediate event as a progress bar on a sixth partial region 526 within the activated first region 511.

For instance, the controller 180 may control the display unit 151 to display a progress bar indicating information related to a distance (or time) remaining to the transfer station from the current location on the sixth partial region 526.

And, the controller 180 may control the display unit 151 to display information indicating a time remaining to a timing point, at which the intermediate event occurs, on the third partial region 523 instead of the second information.

For instance, the controller 180 may control the display unit 151 to display the information indicating a remaining time from the current location to the transfer station on the third partial region 523 instead of the information indicating the time remaining to the destination from the current location.

Meanwhile, if the function is a function for providing information related to a hiking, the first information may include information related to a destination and the second information may include information indicating a current altitude.

Figure 13:
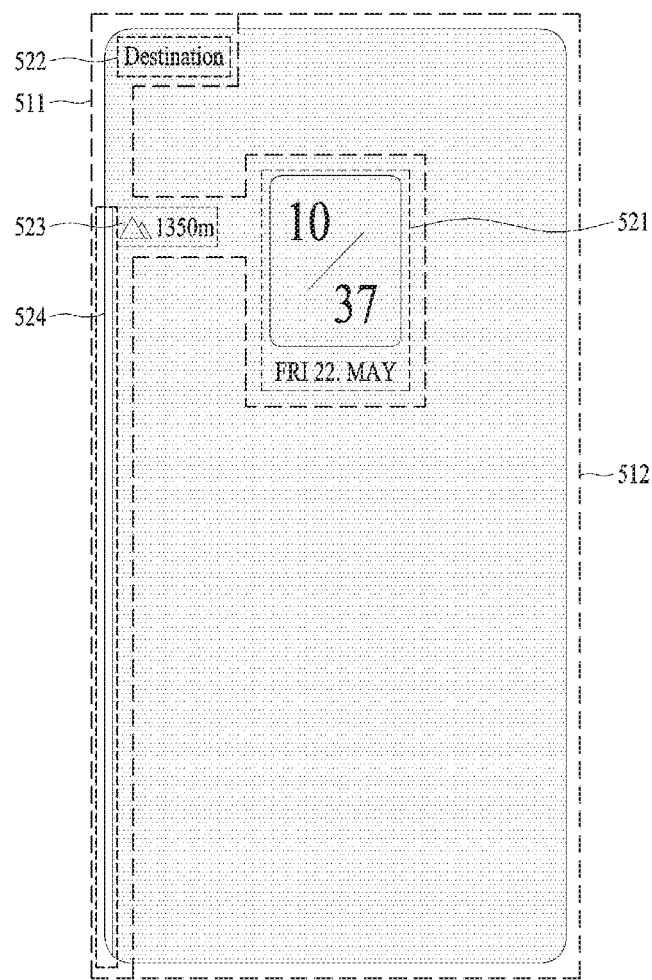

In particular, referring to FIG. 13, the controller 180 may control the display unit 151 to display first information indicating a destination on the second partial region 522 within the activated first region 511. And, the controller 180 may control the display unit 151 to display second information indicating current altitude information on the third partial region 523 within the first region 511. Moreover, the controller 180 may control the display unit 151 to display information indicating a time consumed from an origination to the current location and a time remaining to the destination as a progress bar on the fourth partial region 524 within the activated first region 511.

The third partial region 523 may be determined using a distance from the origination to the destination and a distance from the origination to the current location. Hence, if the current location is changed, the third partial region 523 having the second information displayed thereon may be changed.

A length of the progress bar displayed on the fourth partial region 524 may be determined using a distance from the origination to the destination and a distance from the origination to the current location.

A user checks at least one of the location of the displayed second information and the length of the progress bar displayed on the fourth partial region 524, thereby recognizing a time consumed to the current location (or a distance moved to the current location) and a time (or distance) remaining to the destination.

Meanwhile, if the function is a calorie consumption measurement function, the first information and the second information may include information indicating target calorie consumption and information indicating current calorie consumption, respectively.

Figure 14:
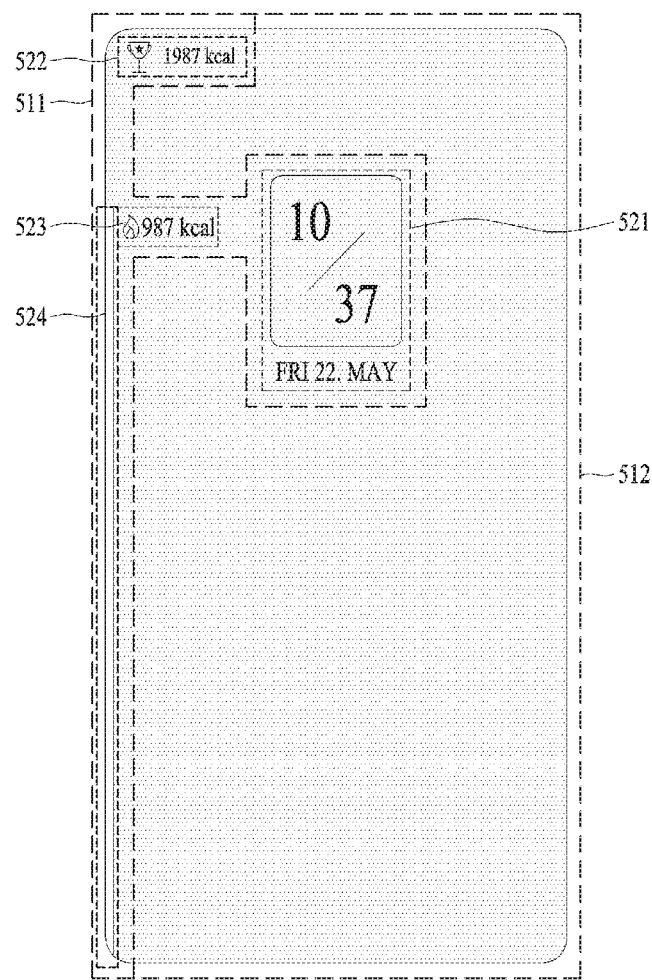

In particular, referring to FIG. 14, the controller 180 may control the display unit 151 to display first information indicating target calorie consumption on the second partial region 522 within the activated first region 511. And, the controller 180 may control the display unit 151 to display second information indicating current calorie consumption on the third partial region 523 within the first region 511. Moreover, the controller 180 may control the display unit 151 to display information indicating how much calories should be further consumed to the target calorie consumption as a progress bar on the fourth partial region 524 within the activated first region 511.

The third partial region 523 may be determined using the target calorie consumption and the current calorie consumption. Hence, if the current calorie consumption is changed, the third partial region 523 having the second information displayed thereon may be changed.

A length of the progress bar displayed on the fourth partial region 524 may be determined using the target calorie consumption and the current calorie consumption.

A user checks at least one of the location of the displayed second information and the length of the progress bar, thereby recognizing calories remaining to the target calorie consumption.

Meanwhile, if the function is a music play function, the first information and the second information may include information related to currently played content and information indicating a current play time, respectively.

Figure 15:
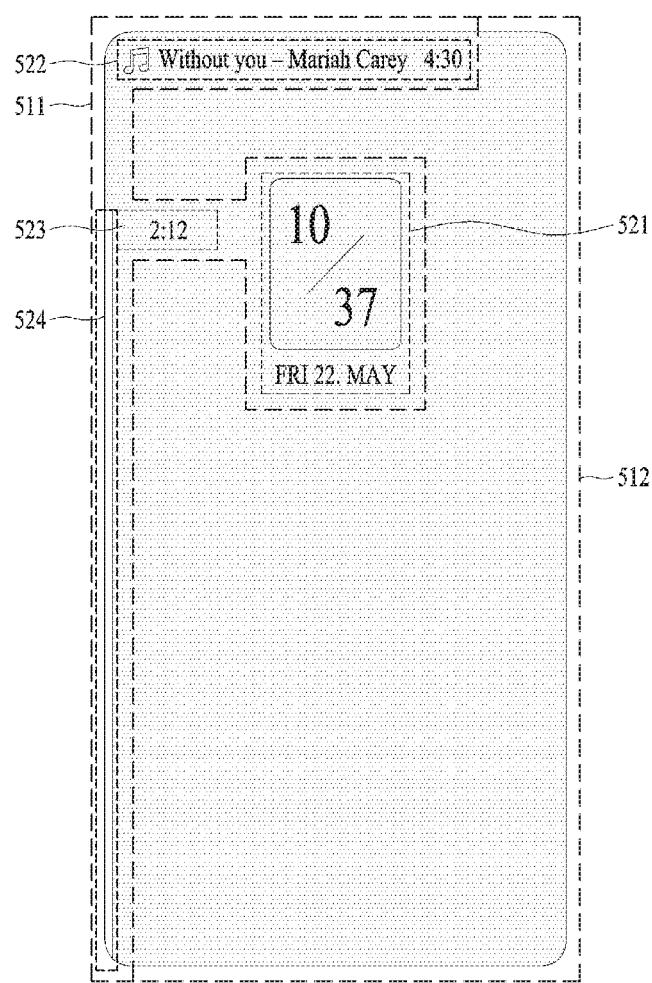

In particular, referring to FIG. 15, the controller 180 may control the display unit 151 to display a first information containing at least one of a title of a currently played content, a total play time of the currently played content, and information related to a person related to the currently played content on the second partial region 522 within the activated first region 511. And, the controller 180 may control the display unit 151 to display second information indicating a current play time in a full play time on the third partial region 523 within the first region 511. Moreover, the controller 180 may control the display unit 151 to display the second information indicating the current play time in the full play time as a progress bar on the fourth partial region 524 within the activated first region 511.

The third partial region 523 may be a region corresponding to the current play time in the full play time. Hence, if the current play time is changed according to a time flow, the third partial region 523 may be changed.

A length of the progress bar displayed on the fourth partial region 524 may be a length corresponding to the current play time in the full play time.

Meanwhile, if the function is a schedule notification function, the first information and the second information may include information indicating a schedule and information indicating a time remaining to a timing point at which the schedule occurs, respectively.

Figure 16:
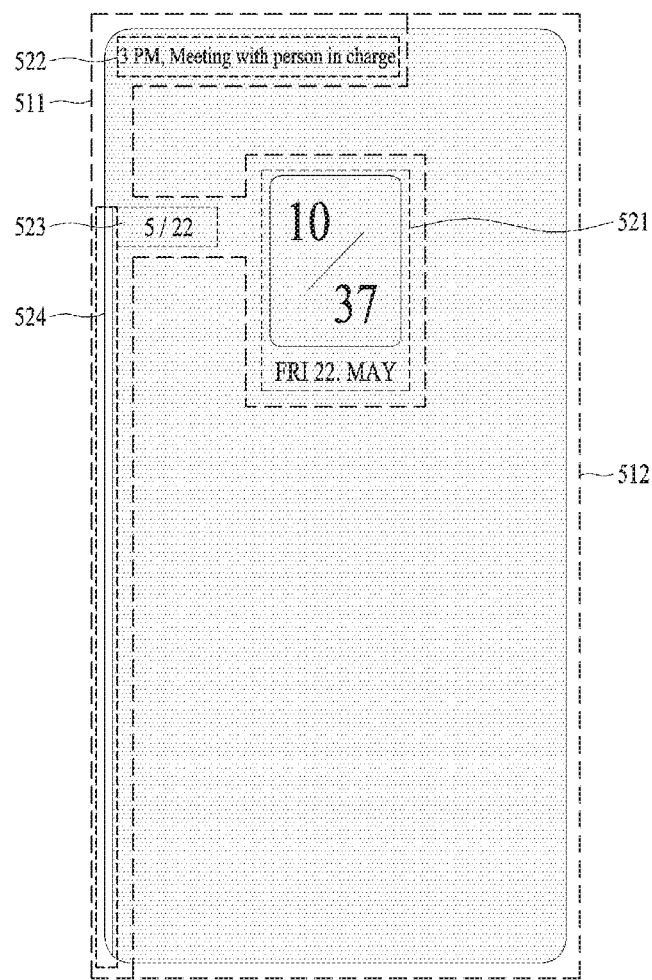

In particular, referring to FIG. 16, the controller 180 may control the display unit 151 to display a date of schedule saved to the memory 170, a time of the schedule, and a substance of the schedule on the second partial region 522 within the activated first region 511. And, the controller 180 may control the display unit 151 to display information indicating a time remaining to a timing point, at which the schedule occurs, on the third partial region 523 within the first region 511. Moreover, the controller 180 may control the display unit 151 to display the information indicating a time remaining to a timing point, at which the schedule occurs, as a progress bar on the fourth partial region 524 within the activated first region (11%) 511.

The third partial region 523 may be a region corresponding to the time remaining to the timing point at which the schedule occurs. Hence, if the remaining time is changed according to a time flow, the third partial region 523 may be changed.

A length of the progress bar displayed on the fourth partial region 524 may be created using the remaining time. Hence, if the remaining time is changed according to the time flow, a length of the progress bar may be changed.

Mobile Terminal Provided with Display Unit Including Main Screen and Auxiliary Screen Meanwhile, according to one embodiment of the present invention, the display unit 151 may include a main screen and an auxiliary screen. This is described in detail with reference to FIGS. 17 to 19.

Figure 17:
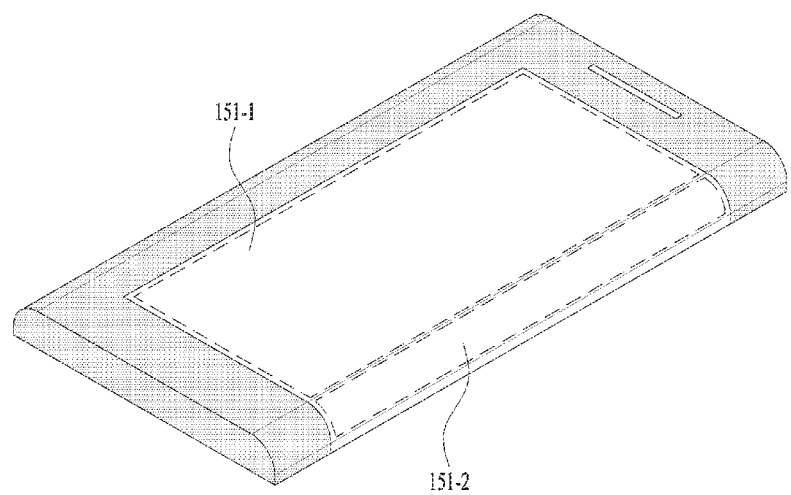
FIGS. 17 to 19 are diagrams to describe examples that a mobile terminal according to one embodiment of the present invention is provided with a display unit including a main screen and an auxiliary screen.
Figure 18:
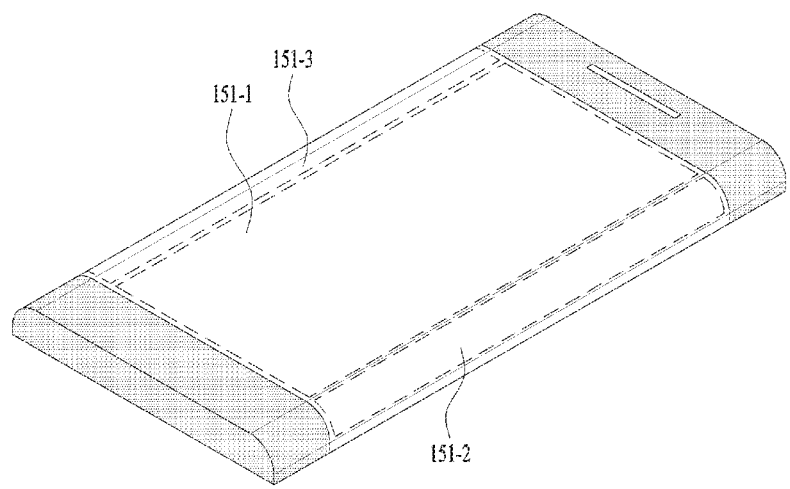
Figure 19:
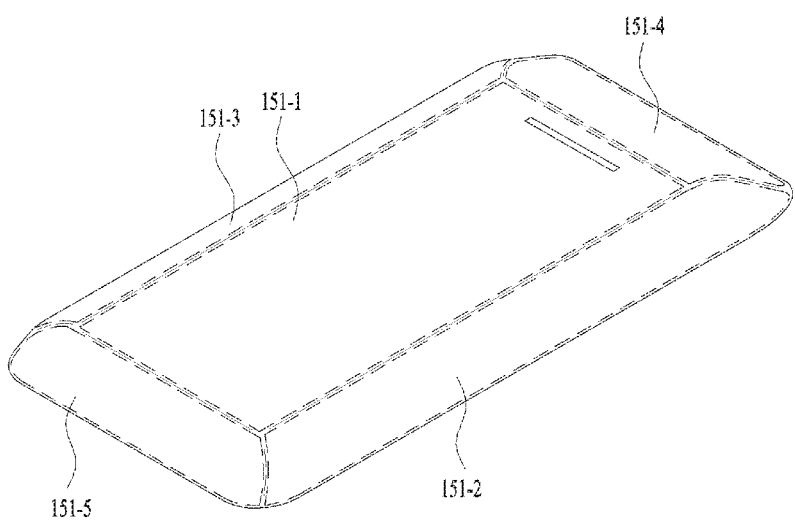

FIGS. 17 to 19 are diagrams to describe examples that a mobile terminal according to one embodiment of the present invention is provided with a display unit including a main screen and an auxiliary screen.

According to the present invention, the display unit 151 may include a main screen and an auxiliary screen. The main screen may be disposed on a front part of the mobile terminal 100. The auxiliary screen 151-2 may include a screen forming a curve by extending from at least one edge of the main screen 151-1.

According to one embodiment of the present invention, the display unit 151 may include a single main screen and a single auxiliary screen.

For instance, referring to FIG. 17, the auxiliary screen 151-2 may include a screen forming a curve by extending from a right (or left) edge of the main screen 151-1.

According to another embodiment of the present invention, the display unit 151 may include a single main screen and a plurality of auxiliary screens.

For instance, referring to FIG. 18, the display unit 151 may include a single main screen 151-1, a first auxiliary screen 151-2 forming a curve by extending from a right edge of the main screen 151-1, and a second auxiliary screen 151-3 forming a curve by extending from a left edge of the main screen 151-1

For another instance, referring to FIG. 19, the display unit 151 may include a single main screen 151-1, a first auxiliary screen 151-2 forming a curve by extending from a right edge of the main screen 151-1, a second auxiliary screen 151-3 forming a curve by extending from a left edge of the main screen 151-1, a third auxiliary screen 151-4 forming a curve by extending from a top edge of the main screen 151-1, and a fourth auxiliary screen 151-5 forming a curve by extending from a bottom edge of the main screen 151-1.

Yet, the main screen, the number of the auxiliary screens and a disposition location of the auxiliary screen are non-limited by the above description.

Meanwhile, according to one embodiment of the present invention, the display unit 151 may include a main screen and at least one auxiliary screen.

Method of Applying AoD (Always on Display) Mode to Mobile Terminal Having Display Unit Including Main Screen and Auxiliary Screen According to one embodiment of the present invention, AoD (Always on Display) mode is applicable to a display unit including a main screen and an auxiliary screen. This is described in detail with reference to FIGS. 20 to 22.

Figure 20:
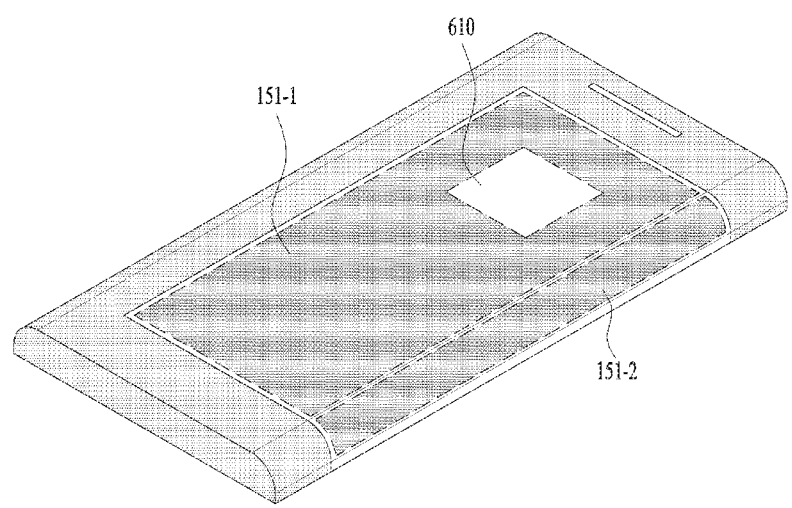
FIGS. 20 to 22 are diagrams to describe examples of a method of applying an Always-on-Display mode in that a mobile terminal according to one embodiment of the present invention is provided with a display unit including a main screen and an auxiliary screen.
Figure 21:
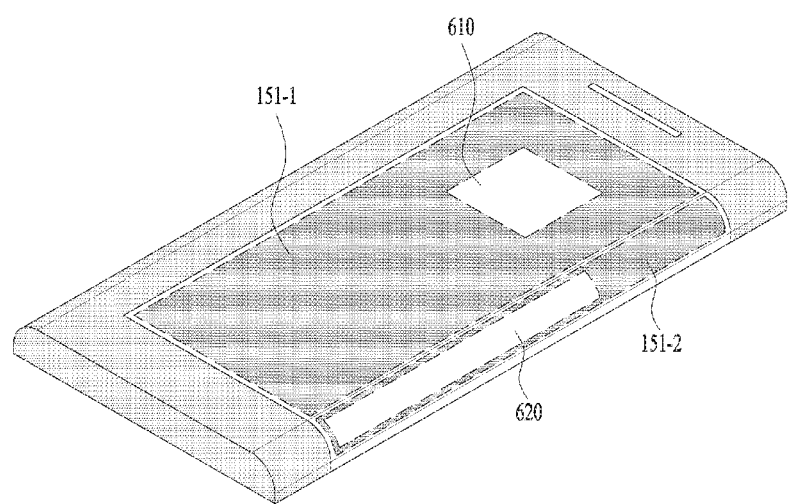
Figure 22:
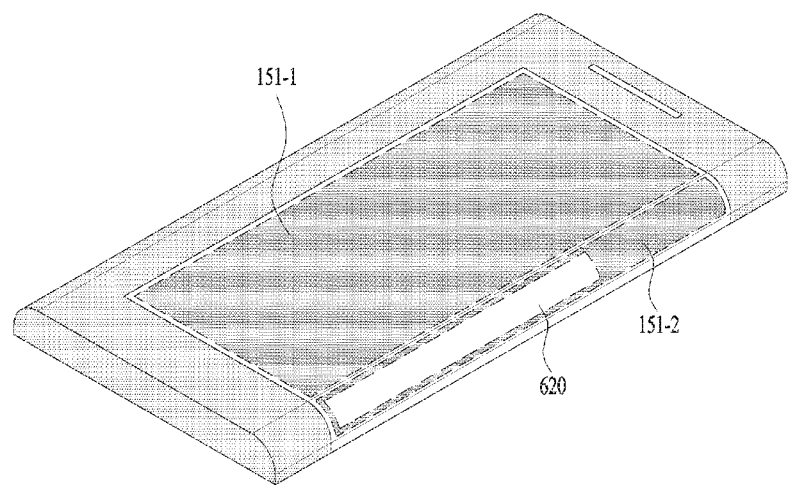

FIGS. 20 to 22 are diagrams to describe examples of a method of applying an Always-on-Display mode in that a mobile terminal according to one embodiment of the present invention is provided with a display unit including a main screen and an auxiliary screen.

First of all, for clarity, the following description is made on the assumption that the display unit 151 includes a single main screen 151-1 and a single auxiliary screen 151-2.

According to one embodiment of the present invention, in response to a display-off command in AoD mode, the controller 180 may control the display unit 151 to activate at least one partial region of the main screen 151-1 and the auxiliary screen 151-2 and deactivate the rest of regions.

For instance, referring to FIG. 20, in response to a display-off command in AoD mode, the controller 180 may control the display unit 151 to activate a first region 610 of the main screen 151-1 and deactivate the rest of regions except the first region 610. And, the controller 180 may control the display unit 151 to deactivate the auxiliary screen 151-2. In doing so, the preset information (e.g., information of a specific application) described with reference to FIGS. 9 to 16 may be displayed on the activated first region 610.

For another instance, referring to FIG. 21, in response to a display-off command in AoD mode, the controller 180 may control the display unit 151 to activate a first region 610 of the main screen 151-1 and deactivate the rest of regions of the main screen 151-1 except the first region 610. And, the controller 180 may control the display unit 151 to activate a second region 620 of the auxiliary screen 151-2 and deactivate the rest of regions of the auxiliary screen 151-2 except the second region 620. In doing so, the preset information (e.g., information of a specific application) described with reference to FIGS. 9 to 16 may be displayed on the activated first region 610 and the second region 620.

In more particular, specific information such as current time information, current date information and the like may be displayed on the first region 610 and information of a specific application may be displayed on the second region 620. The present invention is non-limited by the above description. The information of the specific application may be displayed on the first region 610 and the specific information may be displayed on the second region 620.

For further instance, referring to FIG. 22, in response to a display-off command in AoD mode, the controller 180 may control the display unit 151 to deactivate the main screen 151-1. And, the controller 180 may control the display unit 151 to activate a second region 620 of the auxiliary screen 151-2 and deactivate the rest of regions of the auxiliary screen 151-2 except the second region 620. In doing so, the preset information (e.g., information of a specific application) described with reference to FIGS. 9 to 16 may be displayed on the second region 620.

Meanwhile, according to one embodiment of the present invention, when the display unit 151 includes a single main screen 151-1 and a plurality of auxiliary screens, in response to a display-off command in AoD mode, the controller 180 may control the display unit 151 to activate a partial region of at least one of the main screen 151-1 and a plurality of the auxiliary screens and deactivate the rest of regions.

Method of Adjusting Brightness of Activated Partial Region of Display Unit According to Ambient Illumination Intensity in AoD (Always on Display) Mode According to the present invention, in response to a display-off command in AoD mode, the controller 180 can activate a partial region of the display unit 151 and adjust brightness of the activated partial region according to ambient illumination intensity. This is described in detail with reference to FIG. 23.

Figure 23:
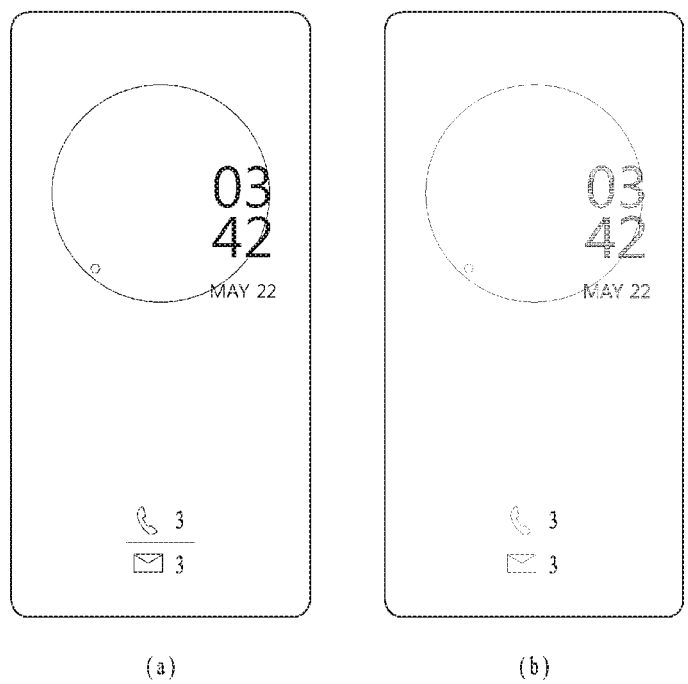
FIG. 23 is a diagram to describe one example of a method of adjusting brightness of a partial region of an activated display unit according to ambient illumination intensity in Always-on-Display mode in a mobile terminal according to one embodiment of the present invention.

FIG. 23 is a diagram to describe one example of a method of adjusting brightness of a partial region of an activated display unit according to ambient illumination intensity in Always-on-Display mode in a mobile terminal according to one embodiment of the present invention.

According to one embodiment of the present invention, the sensing unit 140 may include an illumination sensor 142 configured to sense illumination intensity around the mobile terminal 100. The controller 180 may recognize ambient illumination intensity, which is sensed through the sensing unit 140, of the mobile terminal 100.

While a partial region of the display unit 151 is activated in response to a display-off command in AoD mode, the controller 180 may adjust brightness of the activated partial region of the display unit according to ambient illumination intensity.

For instance, if the ambient illumination intensity is lower than a preset level, as shown in FIG. 23(a), the controller 180 can raise the brightness of the activated partial region. For another instance, if the ambient illumination intensity is equal to or higher than the preset level, as shown in FIG. 23(b), the controller 180 can lower the brightness of the activated partial region.

The present invention is non-limited by the above description. Only if the ambient illumination intensity is equal to or higher than the preset level, as shown in FIG. 23(b), the controller 180 can lower the brightness of the activated partial region. If the ambient illumination intensity is lower than the preset level, as shown in FIG. 23(a), the controller 180 can raise the brightness of the activated partial region.

According to the present embodiment, it is advantageous in preventing a case that preset information displayed on an activated region in AoD mode may not be viewable depending on ambient illumination intensity.

Method of Displaying Preset Video on Activated Partial Region of Display Unit According to Impact Applied to Mobile Terminal in AoD (Always on Display) Mode According to one embodiment of the present invention, the controller 180 may activate a partial region of the display unit in response to a display-off command in AoD mode and control the display unit 151 to display a preset video on the activated partial region according to an impact applied to the mobile terminal. This is described in detail with reference to FIG. 24 and FIG. 25.

Figure 24:
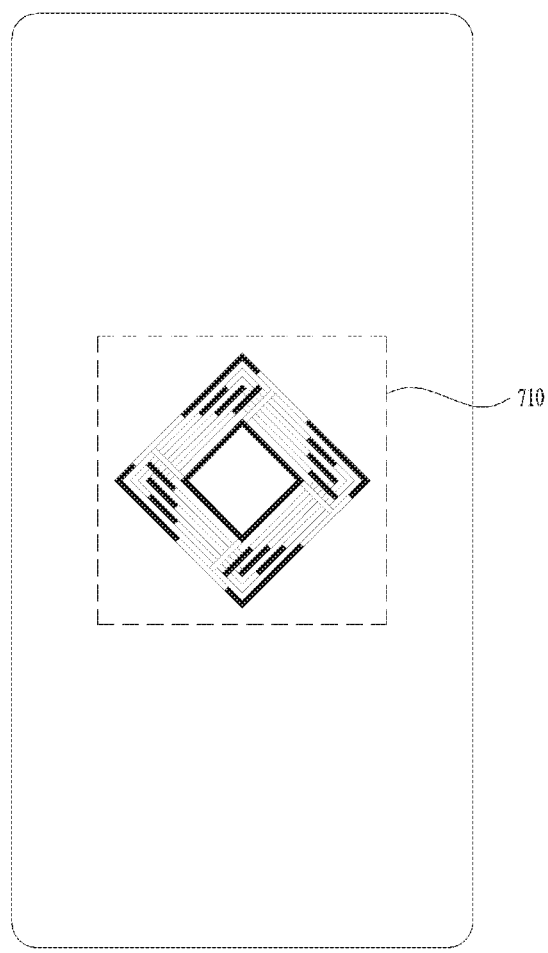
FIG. 24 is a diagram to describe one example of a method of displaying preset video related to a partial region of an activated display unit according to an impact applied to a mobile terminal in Always-on-Display mode in the mobile terminal according to one embodiment of the present invention.

FIG. 24 is a diagram to describe one example of a method of displaying a preset video on a partial region of an activated display unit according to an impact applied to a mobile terminal in Always-on-Display mode in the mobile terminal according to one embodiment of the present invention.

According to one embodiment of the present invention, if a partial region of the display unit 151 is activated in response to a display-off command in AoD mode, the controller 180 may control the display unit 151 to display preset information on the activated partial region.

Meanwhile, the controller 180 may further include an impact sensor configured to sense impact applied to the mobile terminal 100. The controller 180 may recognize a level of the impact sensed through the impact sensor.

Referring to FIG. 24, if recognizing that a level of the impact corresponds to a preset level, the controller 180 may control the display unit 151 to display a preset video 710 on the activated partial region. In doing so, the controller 180 may control the display unit 151 to display the preset video 710 on the activated partial region instead of preset information previously displayed on the activated region. The present invention is non-limited by the above description. And, the controller 180 may control the display unit 151 to display the preset video 710 on the activated partial region together with the preset information.

According to the present embodiment, a user can advantageously recognize that impact has been applied to the mobile terminal.

Figure 25:
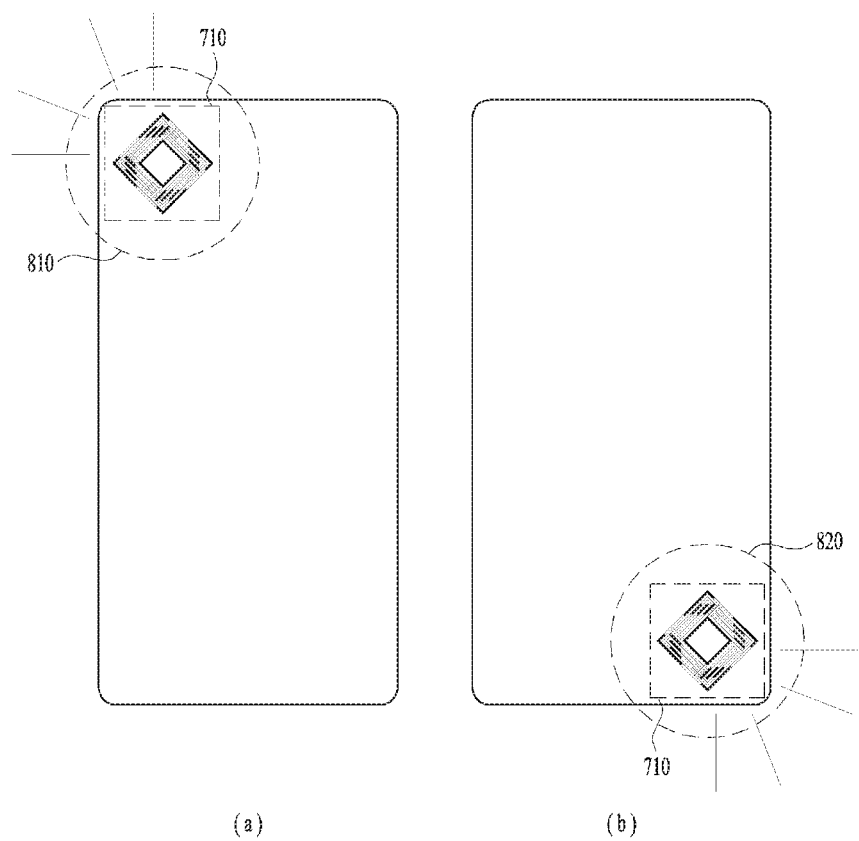
FIG. 25 is a diagram to describe another example of a method of displaying a preset video related to a partial region of an activated display unit according to an impact applied to a mobile terminal in Always-on-Display mode in the mobile terminal according to one embodiment of the present invention.

FIG. 25 is a diagram to describe another example of a method of displaying a preset video on a partial region of an activated display unit according to an impact applied to a mobile terminal in Always-on-Display mode in the mobile terminal according to one embodiment of the present invention.

According to one embodiment of the present invention, if a partial region of the display unit 151 is activated in response to a display-off command in AoD mode, the controller 180 may control the display unit 151 to display preset information on the activated region.

Meanwhile, the controller 180 may further include an impact sensor configured to sense impact applied to the mobile terminal 100. The controller 180 may recognize a level of the impact sensed through the impact sensor. If recognizing that a level of the impact corresponds to a preset level, the controller 180 may recognize a region from which the impact corresponding to the preset level is sensed and control the display unit 151 to display a preset video on a region of the screen corresponding to the recognized region.

For instance, referring to FIG. 25(*a*), if recognizing an impact corresponding to a preset level from a front left top 810 of the mobile terminal 100, the controller 180 may control the display unit 151 to display the preset video 710 on a region of the screen of the mobile terminal corresponding to the recognized region. In doing so, the controller 180 may control the display unit 151 to activate a region for displaying the preset video 710 within the screen and deactivate the rest of regions.

For another instance, referring to FIG. 25(*b*), if recognizing an impact corresponding to a preset level from a front right bottom 820 of the mobile terminal 100, the controller 180 may control the display unit 151 to display the preset video 710 on a region of the screen of the mobile terminal corresponding to the recognized region. In doing so, the controller 180 may control the display unit 151 to activate a region for displaying the preset video 710 within the screen and deactivate the rest of regions.

Figure 26:
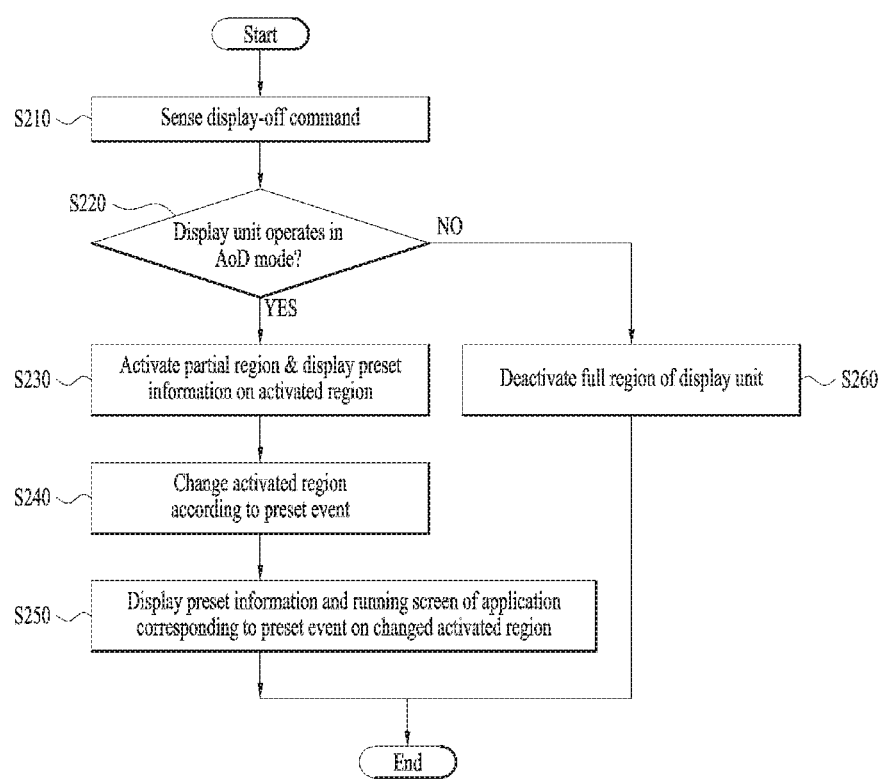
FIG. 26 is a flowchart to describe one example that a running screen of a specific application is displayed related to an activated region according to a set event in Always-on-Display mode in a mobile terminal according to one embodiment of the present invention.

Method of Displaying Running Screen of Application Corresponding to Preset Event on Activated Partial Region of Display Unit According to Preset Event in AoD (Always on Display) Mode FIG. 26 is a flowchart to describe one example that a running screen of a specific application is displayed on an activated region according to a set event in Always-on-Display mode in a mobile terminal according to one embodiment of the present invention.

According to the present invention, the controller 180 may sense a display-off command [S210].

For instance, the controller 180 may recognize a touch input of touching a screen of the display unit 151 a preset count of times as an OFF command for turning off the display unit 151.

For another instance, the controller 180 recognizes a movement of the mobile terminal 100 through the sensing unit 140. If the recognized movement corresponds to a preset movement, the controller 180 can recognize it as an OFF command for turning off the display unit 151.

For further instance, if sensing an input to a preset physical key, the controller 180 can recognize it as an OFF command for turning off the display unit 151.

If sensing a display-off command [S2110], the controller 180 may recognize whether the display unit 151 operates in AoD mode [S220].

If recognizing that the display unit 151 operates in the AoD mode [S220, YES], the controller 180 may control the display unit 151 to activate a partial region of the display unit 151 and deactivate (or, lower an activation level of) the rest region of the display unit 151. In doing so, the controller 180 may control the display unit 151 to display preset information on the activated partial region [S230].

Herein, the preset information may include at least one of information of a specific application, current time information, date information, calendar information, schedule information and the like.

Yet, the controller 180 may change an activated region according to a preset event [S240]. Herein, the preset event may include an event set by a user or an event stored in advance by a manufacturer in the mobile terminal 100

Particularly, the controller 180 may recognize a third region, on which the preset information and the running screen will be displayed within the screen according to the preset event, and control the display unit 151 to activate the recognized third region within the screen.

The controller 180 may control the display unit 151 to display the preset information and the running screen of an application corresponding to the preset event on the third region that is the changed activated region [S250].

For instance, if the preset event is a message reception event, the running screen of the application corresponding to the preset event may include a running screen of a message application. Herein, the running screen of the message application may include information on the received message.

For another instance, if the preset event is a specific content play event, the running screen of the application corresponding to the preset event may include a running screen of a specific content play application. Herein, the running screen of the specific content play application may include information on the currently played content and at least one indicator for performing a specific function.

For further instance, if the preset event is a way guiding event, the running screen of the application corresponding to the preset event may include a running screen of a way guiding application.

On the other hand, if recognizing that the display unit operates in normal mode instead of operating in the AoD mode [S220, NO], the controller 180 may control the display unit 151 to deactivate a full region of the display unit 151 [S260].

According to the present embodiment, if a preset event occurs, although the display unit 151 is in OFF status, the controller 180 can control the display unit 151 to display a running screen of an application corresponding to the preset event. Hence, a user can advantageously and quickly check the running screen corresponding to the preset event without turning on the display unit 151.

Figure 27:
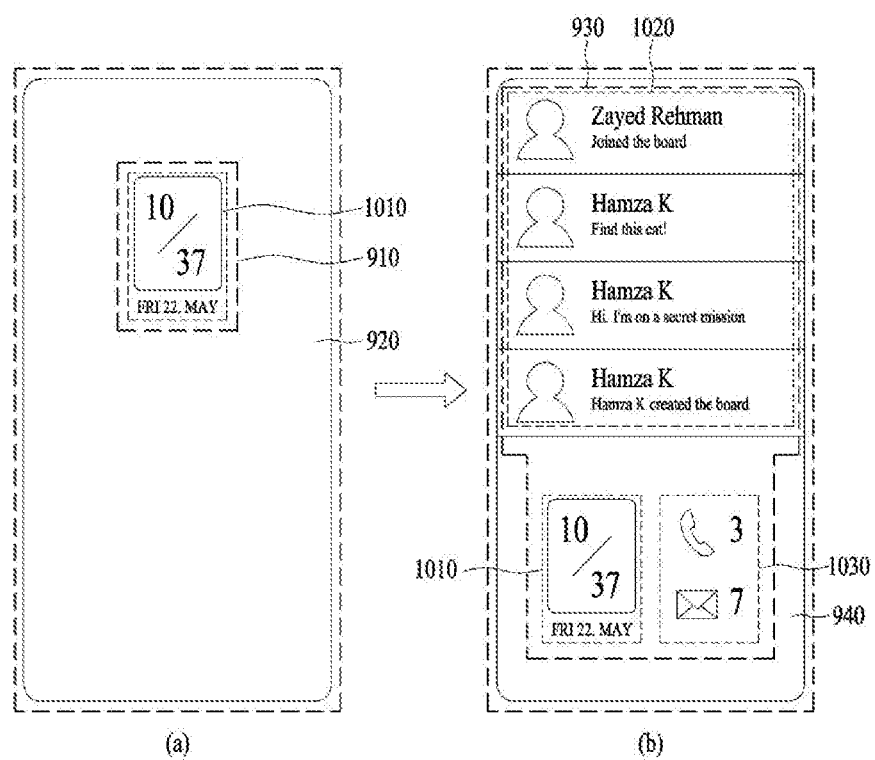
FIG. 27 is a diagram to describe one example that a running screen of a specific application is displayed related to an activated region according to a preset event in Always-on-Display mode in a mobile terminal according to one embodiment of the present invention.

FIG. 27 is a diagram to describe one example that a running screen of a specific application is displayed on an activated region according to a preset event in Always-on-Display mode in a mobile terminal according to one embodiment of the present invention.

According to one embodiment of the present invention, if a partial region of the display unit 151 is activated in response to a display-off command in AoD mode, the controller 180 may control the display unit 151 to display preset information on the activated region.

For instance, referring to FIG. 27(a), while a first region 910 of the display unit 151 is activated in response to a display-off command in AoD mode, the controller 180 may control the display unit 151 to display preset information 1010 on the activated first region 910. In doing so, a second region 920 that is the region other than the first region within a screen may be in deactivated status. The present invention is non-limited by the above description. For instance, an activated level of the second region 920 may be low.

The preset information 1010 may include at least one of information of a specific application, current time information, date information, calendar information, schedule information and the like.

For instance, when the display unit 151 operates in AoD mode, the controller 180 may control the display unit 151 to display the current time information and the date information on the activated first region 910 in response to a display-off command.

Referring to FIG. 27(b), the controller 180 may control the display unit 151 to display a running screen 1020 of an application corresponding to a preset event according to an occurrence of the preset event.

In particular, the controller 180 may recognize a third region 930 on which the preset information 1010 and the running screen 1020 will be displayed within the screen according to the preset event. And, the controller 180 may control the display unit 151 to activate the third region 930 within the screen and deactivate a fourth region 940 within the screen except the third region 930. Moreover, the controller 180 may control the display unit 151 to display the preset information 1010 and the running screen 1020 on the activated third region 930.

In more particular, the third region 930 may include a sixth region including the first region 910, on which the preset information 1010 was displayed, and a seventh region other than the sixth region. And, the controller 180 may control the display unit 151 to display the running screen 1020 on the sixth region and also display the preset information 1010 on the seventh region.

Namely, the controller 180 changes an activated region within the screen according to the preset event and controls the display unit 151 to display the preset information and a running screen of an application corresponding to the preset event on the changed activated region.

The running screen 1020 of the application may include a screen indicating detailed information of the occurring preset event or a running screen of an application corresponding to the occurring preset event.

Meanwhile, if the preset event is a message reception event, the running screen of the application corresponding to the preset event may include a running screen of a message application. And, the running screen of the message application may contain information on the received message.

Particularly, if the preset event is the message reception event, the controller 180 may control the display unit 151 to display a running screen 1020 of a message application containing at least one of information related to a sender of the received message, information related to a received time of the received message and information related to a substance of the received message.

Meanwhile, according to an embodiment, the controller 180 may control the display unit 151 to display an indicator 1030 indicating an event occurrence according to the preset event. In this case, the controller 180 may change the activated region and the deactivated region 940 in consideration of a region for displaying the indicator 1030.

According to the present embodiment, if a preset event occurs, even if the display unit 151 is in OFF status, the controller 180 can display a running screen of an application corresponding to the preset event on the display unit 151. Therefore, a user can advantageously and quickly check the running screen corresponding to the preset event without turning on the display unit 151.

Figure 28:
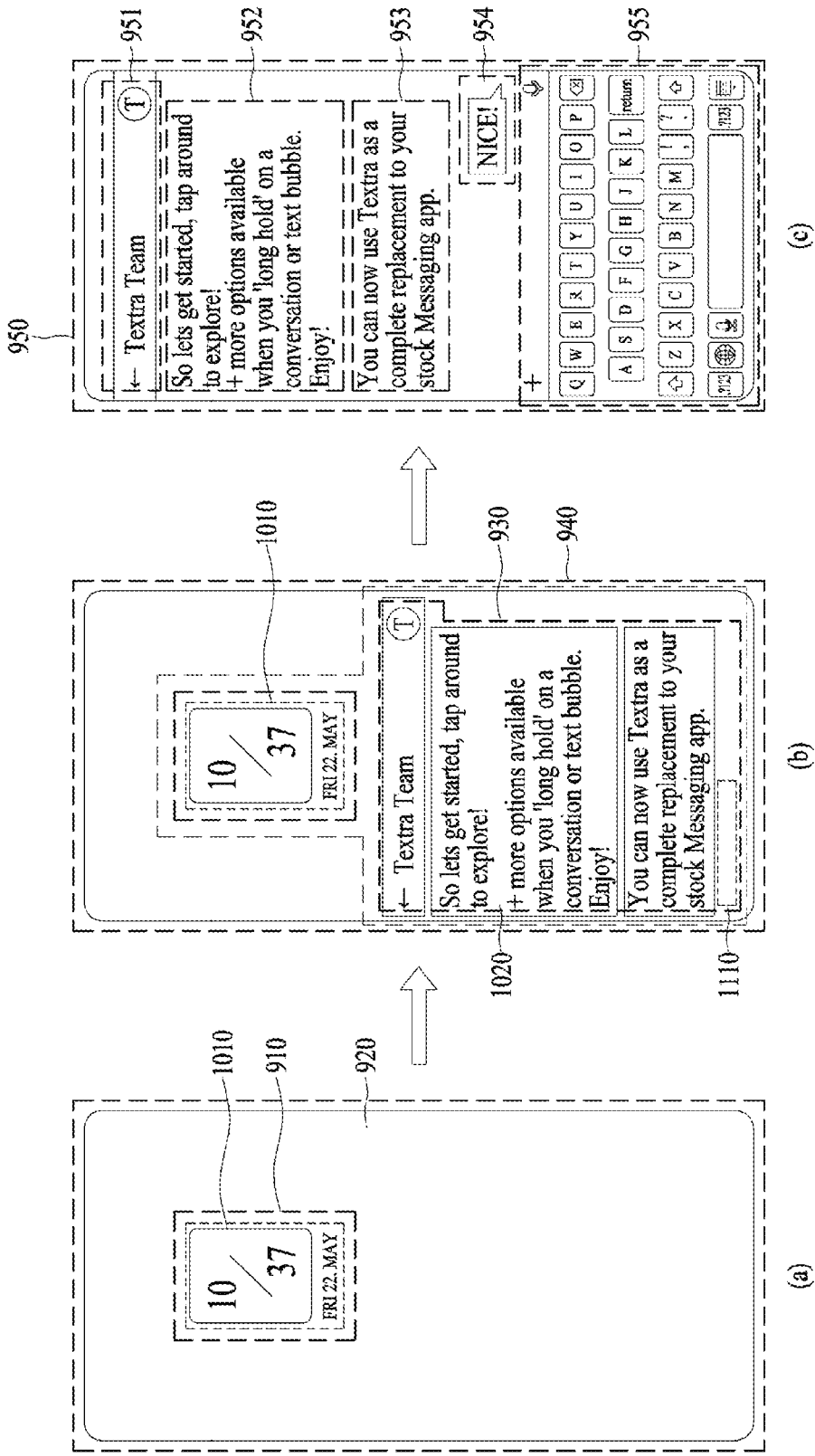
FIG. 28 is a diagram to describe another example that a running screen of a specific application is displayed on an activated region according to a preset event in Always-on-Display mode in a mobile terminal according to one embodiment of the present invention.

FIG. 28 is a diagram to describe another example that a running screen of a specific application is displayed on an activated region according to a preset event in Always-on-Display mode in a mobile terminal according to one embodiment of the present invention.

According to one embodiment of the present invention, if a partial region of the display unit 151 is activated in response to a display-off command in AoD mode, the controller 180 may control the display unit 151 to display preset information related to the activated region.

For instance, referring to FIG. 28(a), while a first region 910 of the display unit 151 is activated in response to a display-off command in AoD mode, the controller 180 may control the display unit 151 to display preset information 1010 on the activated first region 910. In doing so, a second region 920 that is the region other than the first region within a screen may be in deactivated status. Yet, the present invention is non-limited by the above description. For instance, an activated level of the second region 920 may be low.

Herein, the preset information 1010 may include at least one of information of a specific application, current time information, date information, calendar information, schedule information and the like.

Referring to FIG. 28(b), the controller 180 may change an activated region within the screen according to an occurrence of a preset event and control the display unit 151 to display the preset information and a running screen of an application corresponding to the preset event on the changed activated region.

In particular, the controller 180 may recognize a third region 930 on which the preset information 1010 and the running screen 1020 will be displayed within the screen according to the preset event. And, the controller 180 may control the display unit 151 to activate the third region 930 within the screen and deactivate a fourth region 940 within the screen except the third region 930. Moreover, the controller 180 may control the display unit 151 to display the preset information 1010 and the running screen 1020 on the activated third region 930.

In more particular, the third region 930 may include the first region and a fifth region other than the first region. And, the controller 180 may control the display unit 151 to display the preset information 1010 on the first region. And, the controller 180 may control the display unit 151 to display the running screen 1020 on the fifth region.

Meanwhile, if the preset event is a message reception event, the running screen of the application corresponding to the preset event may include transceived messages. And, the running screen may include an indicator 1110 performing a message composing and sending function.

In response to an input for selecting the indicator 1110, the controller 180 may launch the message composing and sending function.

In particular, referring to FIG. 28(c), the controller 180 may control the display unit 151 to display a running screen of the message application on a full region 940 in response to the input for selecting the indicator 1110 shown in FIG. 28(b). And, the controller 180 may control the display unit 151 to display a virtual keyboard for a message input on a prescribed region on the running screen.

For instance, the controller 180 may control the display unit 151 to activate the full region 940 overall and display the running screen of the message application on the activated full region 940. Yet, although a display-off command is sensed, since the full region of the display unit 151 is activated, it may cause a problem that a battery is consumed fast.

For another instance, the controller 180 may control the display unit 151 to activate partial regions 951 to 955 within the full region 940 only and deactivate the rest of regions.

In particular, in response to the input for selecting the indicator 1110 shown in FIG. 28(b), the controller 180 may display the respective transceived messages on the running screen [FIG. 28(c)]. In this case, the controller 180 may control the display unit 151 to activate the region 951 for displaying information indicating counterparts of the currently transceived messages, the regions 952 to 954 for displaying the respective transceived messages and the region 955 for displaying the virtual keyboard and deactivate the rest of the regions except the regions 951 to 955. In this case, it is able to solve the aforesaid problem of the fast battery consumption.

Meanwhile, in case of sensing a SEND command after inputting a text to a message to be sent through the virtual keyboard, the controller 180 may control the wireless communication unit 110 to send a message containing the in putted text.

According to the present embodiment, if a preset event occurs, a user can advantageously take an action corresponding to the preset event without turning on the display unit 151.

Figure 29:
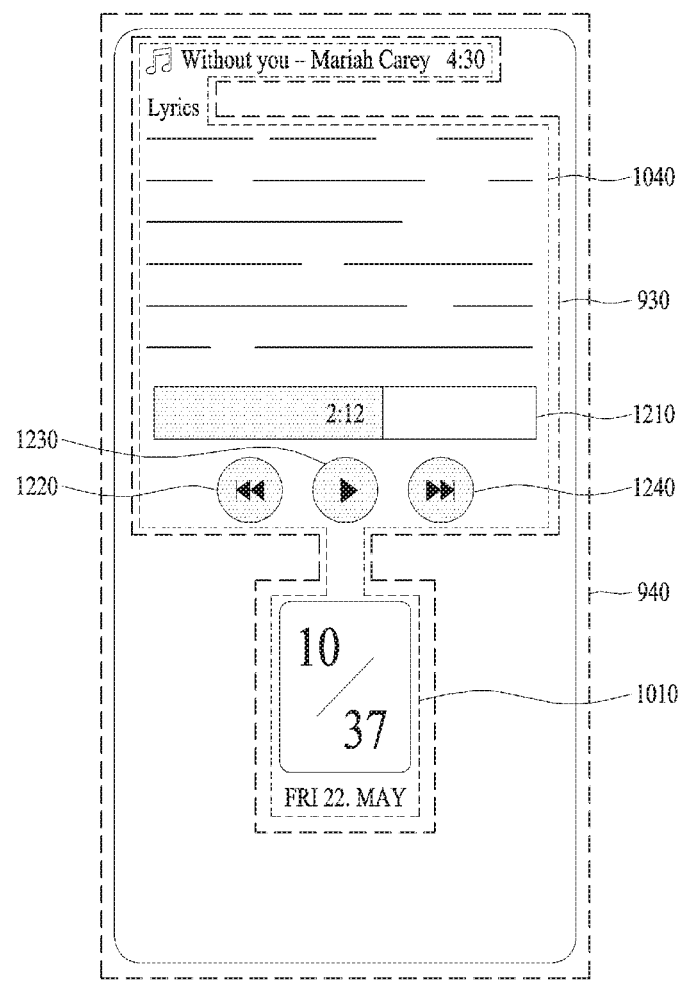
FIG. 29 is a diagram to describe further example that a running screen of a specific application is displayed on an activated region according to a preset event in Always-on-Display mode in a mobile terminal according to one embodiment of the present invention.

FIG. 29 is a diagram to describe further example that a running screen of a specific application is displayed on an activated region according to a preset event in Always-on-Display mode in a mobile terminal according to one embodiment of the present invention.

According to one embodiment of the present invention, if a partial region of the display unit 151 is activated in response to a display-off command in AoD mode, the controller 180 may control the display unit 151 to display preset information on the activated region.

Meanwhile, according to one embodiment of the present invention, the controller changes a region activated with a screen according to a preset event and controls the display unit 151 to display the preset information and a running screen of an application corresponding to the preset event. The following description is made on the assumption that the preset event is a specific content play event.

Referring to FIG. 29, the controller 180 may control the display unit 151 to activate a third region 930 on which the running screen 1040 of the specific content play application and the preset information 1010 will be displayed according to a specific content play event. And, the controller 180 may control the display unit 151 to display the running screen 1040 and the preset information 1010 on the activated third region 930.

Herein, the running screen 1040 may include information on the currently played content and at least one or more indicators 1210, 1220, 1230 and 1240 for performing specific functions.

The information on the currently played content may include information related to a play time of the content and detailed information of the currently played content.

For instance, if the currently played content is music, the information on the currently played content may include at least one of information related to a play time of the music, information related to a title of the music, information related to a singer of the music, and information on lyrics of the music.

Meanwhile, in response to an input for selecting a specific one of the at least one or more indicators 1210, 1220, 1230 and 1240, the controller 180 may control the currently played specific content.

For instance, in response to a touch input to the first indicator 1210 for performing a function of changing a play timing point among the at least one or more indicators, the controller 180 can change a play timing point. For instance, in response to a touch command of touching a point corresponding to a specific play timing point within the first indicator 1210 on which the information on the current play timing point is displayed, the controller 180 can change a play timing point of the currently played content into the specific play timing point corresponding to the point.

For another instance, in response to a touch input to the second indicator 1220 for performing a function of enabling a play timing point of the currently played content to move ahead by a preset time (e.g., 5 seconds) among the at least one or more indicators, the controller 180 can change the play timing point to move ahead by the preset time.

For further instance, in response to a touch input to the third indicator 1230 for performing a function of pausing the currently played content t among the at least one or more indicators, the controller 180 can pause the currently played content.

For another further instance, in response to a touch input to the fourth indicator 1240 for performing a function of enabling a play timing point of the currently played content to move behind by a preset time (e.g., 5 seconds) among the at least one or more indicators, the controller 180 can change the play timing point to move behind by the preset time.

Figure 30:
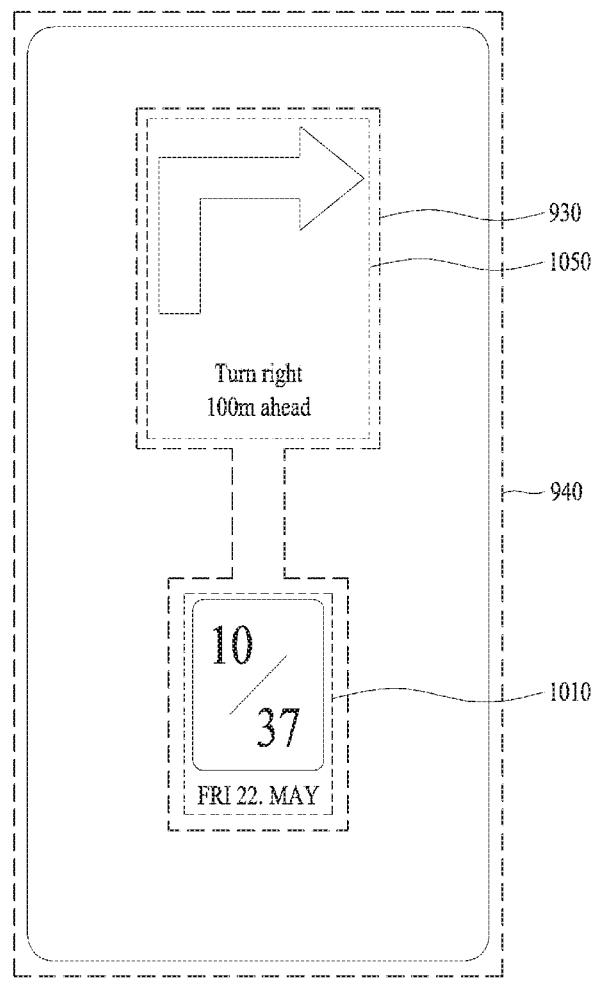
FIG. 30 is a diagram to describe another further example that a running screen of a specific application is displayed on an activated region according to a preset event in Always-on-Display mode in a mobile terminal according to one embodiment of the present invention.

FIG. 30 is a diagram to describe another further example that a running screen of a specific application is displayed on an activated region according to a preset event in Always-on-Display mode in a mobile terminal according to one embodiment of the present invention.

According to one embodiment of the present invention, if a partial region of the display unit 151 is activated in response to a display-off command in AoD mode, the controller 180 may control the display unit 151 to display preset information on the activated region.

Meanwhile, according to one embodiment of the present invention, the controller changes a region activated with a screen according to a preset event and controls the display unit 151 to display the preset information and a running screen of an application corresponding to the preset event. The following description is made on the assumption that the preset event is an event for performing a way guiding function.

Referring to FIG. 30, the controller 180 may control the display unit 151 to activate a third region 930 on which the running screen 1050 of the application for performing the way guiding function and the preset information 1010 will be displayed according to an event for performing the way guiding function. And, the controller 180 may control the display unit 151 to display the running screen 1050 and the preset information 1010 on the activated third region 930.

Herein, the running screen 1050 may include a screen on which information is changed by real time according to the way guiding function.

For instance, if recognizing that it should take a right turn 100 m ahead in order to arrive at a destination from a current location, the controller 180 may control the display unit 151 to display information indicating to make a right turn 100 m ahead on the activated third region 930. If recognizing that it should go straight to arrive at the destination after making the right turn 100 m ahead, the controller 180 may change the displayed information into information indicating to go straight.

According to at least one of the embodiments of the present invention, while a display unit is operating in AoD (Always-on-Display) mode, since information of a specific application is displayed on a partial region activated in response to a display-off command, a user can advantageously obtain information desired by the user without turning on the display unit. Moreover, while a display unit is operating in Always-on-Display mode, brightness of a partial region activated in response to a display-off command can be advantageously changed according to ambient illumination intensity.

Various embodiments may be implemented using a machine-readable medium having instructions stored thereon for execution by a processor to perform various methods presented herein. Examples of possible machine-readable mediums include HDD(Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

INDUSTRIAL APPLICABILITY

The present invention relates to a mobile terminal and a method for controlling the same. Therefore, the present invention has industrial applicability.

What is claimed is:

1. A mobile terminal, comprising:
a display comprising at least one screen and configured to operate in either a first mode or a second mode; and
a controller configured to:
  detect a command to turn off the display;
  control the display to activate a first region of the at least one screen, deactivate a second region of the at least one screen, display time and date information on a first predetermined area of the display within the activated first region, and display first information related to an application on the activated first region in response to the detected command when the display is operated in the first mode, the first information comprising second information related to a function performed by the application and third information related to progress of the function;
  control the display to deactivate the entire at least one screen in response to the detected command when the display is operated in the second mode;
  generate the third information based on the second information and control the display to display the second information and third information on separate areas of the activated first region; and
  in response to occurrence of a predefined event:
    change a location and a shape of the activated first region such that the time and date information is moved from the first predefined area onto a second predetermined area of the display within the changed location of the activated first region, the second predetermined area being differently configured based on a type of the predefined event; and
    control the display to display the predefined event on the changed location of the activated first region such that the predefined event is displayed above the moved time and date information displayed on the second determined area, the changed location and shape being differently configured based on the type of the predefined event.

2. The mobile terminal of claim 1, further comprising a sensing unit configured to sense ambient illumination of the mobile terminal,
wherein the controller is further configured to control the display to adjust brightness of the activated first region according to the sensed ambient illumination.

3. The mobile terminal of claim 1, wherein the controller is further configured to control the display to display the third information as a progress bar.

4. The mobile terminal of claim 1, further comprising a sensing unit configured to sense an impact,
wherein the controller is further configured to control the display to display video when the sensed impact corresponds to a preset level.

5. The mobile terminal of claim 4, wherein the controller is further configured to:
recognize a region on which the sensed impact corresponding to the preset level occurs; and
control the display to display the video on a region within a screen corresponding to the recognized region.

6. The mobile terminal of claim 1, wherein the display comprises a first screen and a second screen and the controller is further configured to:
activate a partial region of the first screen or second screen; and
control the display to display the first information on the activated partial region.

7. The mobile terminal of claim 1, wherein:
the function is an alarm function;
the second information indicates time for which an alarm is set; and
the third information indicates a portion of the time remaining.

8. The mobile terminal of claim 1, wherein:
the function is a wayfinding function;
the second information indicates a destination; and
the third information indicates remaining time to the destination from a current location or time consumed from an origination location to the current location.

9. The mobile terminal of claim 1, wherein:
the function is a calorie consumption measurement function;
the second information indicates target calorie consumption; and
the third information indicates current calorie consumption.

10. The mobile terminal of claim 1, wherein:
the function is a music function;
the second information indicates currently played content; and
the third information indicates a current portion of a full play time of the content.

11. A method of controlling a display comprising at least one screen and configured to operate in either a first mode or a second mode, the method performed by a controller and comprising:
detecting a command to turn off the display;
activating a first region of the at least one screen, deactivating a second region of the at least one screen, displaying time and date information on a first predetermined area of the display within the activated first region, and displaying first information related to an application on the activated first region in response to the detected command when the display is operated in the first mode, the first information comprising second information related to a function performed by the application and third information related to progress of the function; and
deactivating the entire at least one screen in response to the detected command when the display is operated in the second mode,
wherein the third information is generated based on the second information and the second information and third information are displayed on separate areas of the activated first region, and
wherein in response to occurrence of a predefined event:
a location and a shape of the activated first region are changed such that the time and date information is moved from the first predetermined area onto a second predetermined area of the display within the changed location of the activated first region, the second predetermined area being differently configured based on a type of the predefined event; and
the predefined event is displayed on the changed location of the activated first region such that the predefined event is displayed above the moved time and date information displayed on the second determined area, the changed location and shape being differently configured based on the type of the predefined event.

12. The method of claim 11, further comprising:
sensing ambient illumination; and
adjusting brightness of the activated first region according to the sensed ambient illumination.

13. The method of claim 11, further comprising displaying the third information as a progress bar.

14. The method of claim 11, further comprising:
sensing an impact; and
displaying video on the display when the sensed impact corresponds to a preset level.

15. The method of claim 14, further comprising:
recognizing a region on which the sensed impact corresponding to the preset level occurs; and
displaying the video on a region of the display within a screen corresponding to the recognized region.

16. The method of claim 11, wherein the display further comprises a first screen and a second screen and further comprising:
activating a partial region of the first screen or second screen; and
displaying the first information on the activated partial region.

17. The method of claim 11, wherein:
the function is an alarm function;
the second information indicates time for which an alarm is set; and
the third information indicates a portion of the time remaining.

18. The method of claim 11, wherein:
the function is a wayfinding function;
the second information indicates a destination; and
the third information indicates remaining time to the destination from a current location or time consumed from an origination location to the current location.

19. The method of claim 11, wherein:
the function is a calorie consumption measurement function;
the second information indicates target calorie consumption; and
the third information indicates current calorie consumption.

20. The method of claim 11, wherein:
the function is a music function;
the second information indicates currently played content; and
the third information indicates a current portion of a full play time of the content.

* * * * *